(12) United States Patent
Vollath et al.

(10) Patent No.: US 7,982,667 B2
(45) Date of Patent: Jul. 19, 2011

(54) POST-PROCESSED ACCURACY PREDICTION FOR GNSS POSITIONING

(75) Inventors: Ulrich Vollath, Ismaning (DE); Soeren Ulf Klose, Strausberg (DE)

(73) Assignee: Trimble Navigation Limited, Sunnyvale, CA (US)

( * ) Notice: Subject to any disclaimer, the term of this patent is extended or adjusted under 35 U.S.C. 154(b) by 354 days.

(21) Appl. No.: 12/291,888

(22) Filed: Nov. 14, 2008

(65) Prior Publication Data

US 2009/0135057 A1     May 28, 2009

Related U.S. Application Data

(63) Continuation-in-part of application No. 11/786,017, filed on Apr. 9, 2007, now Pat. No. 7,498,979.

(60) Provisional application No. 61/003,167, filed on Nov. 14, 2007.

(51) Int. Cl.
    *G01S 19/41*     (2010.01)
    *G01S 19/40*     (2010.01)
    *G01S 19/44*     (2010.01)
    *G01S 19/32*     (2010.01)

(52) U.S. Cl. ......... 342/357.24; 342/357.23; 342/357.27; 342/357.72

(58) Field of Classification Search ............ 342/357.23–357.24, 357.27, 357.72
See application file for complete search history.

(56) References Cited

U.S. PATENT DOCUMENTS

| | | | |
|---|---|---|---|
| 5,764,184 A * | 6/1998 | Hatch et al. | 342/357.44 |
| 6,144,335 A * | 11/2000 | Rogers et al. | 342/357.27 |
| 6,934,632 B2 | 8/2005 | Hatch | |
| 2005/0101248 A1 | 5/2005 | Vollath | |
| 2007/0120733 A1 | 5/2007 | Vollath et al. | |
| 2008/0165053 A1 | 7/2008 | Liu et al. | |
| 2010/0225533 A1* | 9/2010 | Allan et al. | 342/357.23 |

OTHER PUBLICATIONS

L. Mader et al., "*Using Interpolation and Extrapolation Techniques to Yield High Data Rates and Ionosphere Delay Estimates from Continuously Operating GPS Networks*", ION GPS 2002, Sep. 24-27, 2002, Portland, OR, pp. 2342-2347.

(Continued)

*Primary Examiner* — Thomas H Tarcza
*Assistant Examiner* — Fred H Mull
(74) *Attorney, Agent, or Firm* — Bruce D Riter

(57) ABSTRACT

Methods and apparatus for processing of data from GNSS receivers are presented. (1) A real-time GNSS rover-engine, a long distance multi baseline averaging (MBA) method, and a stochastic post-processed accuracy predictor are described. (2) The real-time GNSS rover-engine provides high accuracy position determination (decimeter-level) with short occupation time (2 Minutes) for GIS applications. The long distance multi baseline averaging (MBA) method improves differential-correction accuracy by averaging the position results from several different baselines. This technique provides a higher accuracy than any single baseline solution. It was found, that for long baselines (more than about 250 km), the usage of non-iono-free observables (e.g. L1-only or widelane) leads to a higher accuracy with MBA compared to the commonly used iono-free (LC) combination, because of the less noisy observables and the cancellation of the residual ionospheric errors. (3) The stochastic post-processed accuracy (SPPA) predictor calculates during data collection an estimate of the accuracy likely to be achieved after post-processing. This helps to optimize productivity when collecting GNSS data for which post-processed accuracy is important. The predictor examines the quality of carrier measurements and estimates how well the post-processed float solution will converge in the time since carrier lock was obtained.

22 Claims, 24 Drawing Sheets

OTHER PUBLICATIONS

L. Sjöberg, *The best linear combinations of L1 and L2 frequency observables in the application of Transit/Doppler and GPS*, Manuscripta Geodetica 15, 1990, pp. 17-22.

A. Gelb, Applied Optimal Estimation, MIT Press, 1974, Chapter 5, *Optimal Linear Smoothing*, pp. 156-179.

K. Chen et al., *Real-Time Precise Point Positioning Using Single Frequency Data*, ION GNSS 18$^{TH}$ International Technical Meeting of the Satellite Division, Sep. 13-16, 2005, Long Beach, CA, pp. 1514-1523.

E. Gill et al., *High-Precision Onboard Orbit Determination for Small Satellites—the GPS-Based XNS on X-SAT*, 6$^{TH}$ Symposium on Small Satellites Systems and Services, Sep. 20-24, La Rochelle, France, 2004, pp. 1-6.

S. Leung et al., *High Precision Real-Time Navigation for Spacecraft Formation Flying*, ION GPS/GNSS 2003, Sep. 9-12, 2003, Portland, OR, pp. 2182-2193.

B. Remondi et al., Final Report: Investigation of Global Positioning System Single Frequency Hardware for the U.S. Environmental Protection Agency, EPA Reference DW13936132-01-0, Apr. 1994, ten pages.

T. Yunck, Single-*Frequency Precise Orbit Determination*, Global Positioning System: Theory and Applications vol. II, vol. 164 Progress in Astronautics and Aeronautics, pp. 581-584.

Getting Started Guide: GeoExplorer 2005 Series, Version 1.00, Revision A, Part No. 46506-40-ENG, Oct. 2005, Trimble Navigation Limited, 114 pages.

White Paper: H-Star Technology Explained, Trimble Navigation Limited, 2005, 9 pages.

Quick Reference Guide: Trimble GPScorrect Extension, Version 1.10, Revision A, Apr. 2005, Trimble Navigation Limited, 114 pages.

Trimble GPScorrect Extension: Release Notes, Version 1.11, Revision A, Oct. 2005, Trimble Navigation Limited, 38 pages.

Getting Started Guide: GPS Pathfinder Office Software, Version 3.10, Revision A, Part No. 34231-31-ENG, Apr. 2005, Trimble Navigation Limited, 158 pages.

GPS Pathfinder Office Release Notes, Version 3.10, Part No. 34195-31-ENG, Revision A, Apr. 2005, Trimble Navigation Limited, 24 pages.

User Guide: GPS Pathfinder Pro Series, Version 1.00, Revision A, May 2005, Trimble Navigation Limited, 46 pages.

GPS Pathfinder Tools SDK: Release Notes, Version 2.00, Part No. 37237-61-ENG, Revision A, Jun. 2005, 44 pages.

Reference Manual: TerraSync Software, Version 2.50, Revision A, Apr. 2005, Trimble Navigation Limited, 352 pages.

Getting Started Guide: Trimble GPS Analyst Extension, Version 1.10, Revision A, Part No. 52652-01, Apr. 2005, 240 pages.

Trimble GPS Analyst Extension: Release Notes, Version 1.10, Part No. 52652-01, Revision A, Apr. 2005, 28 pages.

S. Bisnath et al., *Evaluation of Commercial Carrier Phase-Based WADGPS Services for Marine Applications*, ION GPS/GNSS 2003, Sep. 9-12, 2003, Portland OR, pp. 17-27.

D. Lapucha et al., *Multisite Real-Time DGPS System Using Satellite Data Link: Operational Results*, Navigation: Journal of the Institute of Navigation, vol. 40, No. 3, Fall 1993, pp. 283-296.

D. Lapucha et al., *Decimeter-Level Real-Time Carrier Phase Positioning Using Satellite Link*, ION GPS 2001, Sep. 11-14, 2001, Salt Lake City, UT, pp. 1624-1630.

D. Lapucha et al.,*Comparison of the Two Alternate Methods of Wide Area Carrier Phase Positioning*, ION GNSS 17$^{th}$ International Technical Meeting of the Satellite Division, Sep. 21-24, 2004, Long Beach, CA, pp. 1864-1871.

A. Simsky, *Standalone Real-time Navigation Algorithm for Single-frequency Ionosphere-free Positioning Based on Dynamic Ambiguities (DARTS-SF )*, ION GNSS 2006, Fort Worth, USA, Sep. 26-29, 2006, ten pages.

N. Talbot, "*Compact Data Transmission Standard for High-Precision GPS*", Proceedings of the 9th International Technical Meeting of the Satellite Division of the Institute of Navigation ION GPS 1996, Sep. 17-20, 1996, Kansas City, MO, pp. 86-871.

*RTCM 10402.3 Recommended Standards for Differential GNSS Service, Version 2.3*, Radio Technical Commission for Maritime Services, 2001.

*RTCM 10403.1 Recommended Standards for Differential GNSS Service, Version 3*, Radio Technical Commission for Maritime Services, 2007.

B. Hofmann-Wellenhof, GPS Theory and Practice, 2d. Ed., 1992, Chapter 9, pp. 179-227.

D. Lapucha et al., "*High-Rate Precise Real-Time Positioning Using Differential Carrier Phase*", ION GPS-95, Sep. 12-15, 1995, Palm Springs, CA, pp. 1443-1449.

Y. Gao et al., *High Precision Kinematic Positioning Using Single Dual-Frequency Receiver*, The International Archives of the Photogrammetry, Remote Sensing and Spatial Information Sciences, Proc. of the XX$^{TH}$ ISPRS Congress, Istanbul, Turkey, 2004, vol. 34, Part B3, pp. 845-849.

G. Welch et al., *An Introduction to the Kalman Filter*, UNC-Chapel Hill, TR 95-041, Jul. 24, 2006 (sixteen pages).

U. Vollath et al., *Network RTK Versus Single Base RTK—Understanding the Error Characteristics*, Proceedings of the GNSS-2002 Conference, May 2002, pp. 2774-2780.

F. Brunner et al., *GPS Signal Diffraction Modelling: The Stochastic SIGMA-D Model*, J. Geod., 73, 259-267, 1999.

H. Hartinger et al., *Variances of GPS Phase Observations: The SIGMA-E Model*, GPS Solutions, 2/4, 35-43, 1999.

G. Bierman, *Factorization Methods for Discrete Sequential Estimation*, Academic Press, 1977.

A. Gelb, (Ed.), *Applied Optimal Estimation*, The M.I.T. Press, 1977, pp. 133-136.

F. Van Diggelen, *GPS Accuracy: Lies, Damn Lies, and Statistics*, GPS World, Nov. 29, 1998 (five pages).

A. Wiesner et al., *An extended weight model for GPS phase observations*, Earth Plants Space, 52, pp. 777-782, 2000.

R. Brown et al., Introduction to Random Signals and Applied Kalman Filtering, Second Edition, John Wiley & Sons, 1992, Chapter 10, pp. 410-455.

\* cited by examiner

Interpolate Measurement at Epoch $t_1$ from Epochs $t_0$ and $t_2$

POST-PROCESSED ACCURACY PREDICTION FOR GNSS POSITIONING

CROSS REFERENCE TO RELATED APPLICATIONS

The content of U.S. patent application: VOLLATH U., "Ambiguity Estimation of GNSS Signals for Three or more Carriers," application Ser. No. 10/696,528 filed Oct. 28, 2003, Pub. No.: US 2005/0101248 A1 published May 12, 2005, now U.S. Pat. No. 7,432,853 is incorporated herein by this reference.

The content of U.S. patent application: VOLLATH U. and DOUCET K., "Multiple-GNSS and FDMA High-Precision Carrier-Phase Based Positioning," Appl. No. 60/723,038 filed Oct. 3, 2005 is incorporated herein by this reference.

The content of U.S. Patent Application: VOLLATH U. AND DOUCET K., "Multiple-GNSS and FDMA High-Precision Carrier-Phase Based Positioning," application Ser. No. 11/526,960 filed Sep. 26, 2006, Publ. No.: US 2007/0120733 A1 published May 31, 2007, now U.S. Pat. No. 7,312,747, is incorporated herein by this reference.

The content of U.S. patent application: Liu J. et al., "Fast Decimeter-Level GNSS Positioning", Appl. No. 60/792,911 filed Apr. 17, 2006 is incorporated herein by this reference.

This application is a continuation-in-part of U.S. Patent Application: LIU J. et al., "Fast Decimeter-Level GNSS Positioning", application Ser. No. 11/786,017 filed Apr. 9, 2007, the content of which is incorporated by this reference. This application claims the benefit of U.S. Provisional Application No. 61/003,167 filed Nov. 14, 2007 of KLOSE, S. et al. "Real-Time Fast Decimeter-Level GNSS Positioning."

FIELD OF THE INVENTION

The present invention relates to the field of Global Navigation Satellite Systems. More particularly, the present invention relates to real-time fast decimeter-level GNSS positioning. Especially, the convergence time of the float position solution is substantially reduced.

BACKGROUND OF THE INVENTION

Global Navigation Satellite Systems (GNSS) include the Global Positioning System (GPS), the Glonass system, and the proposed Galileo system. Each GPS satellite transmits continuously two radio frequencies in the L-band, referred to as L1 and L2, at respective frequencies of 1575.41 MHz and 1227.60 MHz. Two signals are transmitted on L1, one for civil users and the other for users authorized by the Unites States Department of Defense (DoD). One signal is transmitted on L2, intended only for DoD-authorized users. Each GPS signal has a carrier at the L1 and L2 frequency, a pseudo-random number (PRN) code, and satellite navigation data. Two different PRN codes are transmitted by each satellite: a coarse acquisition (C/A) code and a precision (P/Y) code which is encrypted for DoD-authorized users. Each C/A code is a unique sequence of 1023 bits, which is repeated each millisecond.

Improved methods and apparatus for processing GNSS signals are desired, particularly to achieve a position accuracy in the decimeter range.

SUMMARY OF THE INVENTION

Improved methods and apparatus for processing GNSS signals are provided by embodiments in accordance with the present invention. To achieve a position-accuracy in the decimeter range, GNSS observations from one or more reference stations are used. The reference observations together with the GNSS observations from the rover receiver are used to perform differential carrier-phase positioning with float-ambiguities. To reduce the convergence time of the float-ambiguities and positions (float-solution), a number of innovative techniques have been developed. These are summarized as follows:

PART 1: Real-Time GNSS Rover-Engine. In accordance with some embodiments of the invention, a real-time rover-engine is provided which enables a two decimeter (1-sigma) horizontal positioning accuracy after an occupation time (more precisely, the carrier lock duration) of two minutes with single- or dual-frequency differential carrier phase positioning for baselines up to several hundred kilometers. This is a great performance leap compared to current processing engines on the market, where the occupation time is usually several times as long for the same accuracy. To achieve the goal of high accuracy with low occupation time, a number of innovative techniques have been developed, including: interpolation and extrapolation of the reference data to match the rover data, using the minimum-error combination for the dual-frequency case, using the L1 carrier phase and the L1 carrier phase plus L1 code combination with single-differencing to efficiently filter the single-frequency case, forward filtering with the application of the whitening of noise technique to remove redundant multipath states, and detection of movement of the rover during static periods.

PART 2: Long Distance Multi Baseline Averaging (MBA). In accordance with some embodiments of the invention, the accuracy is further enhanced, in particular for long distances, with multi baseline averaging (MBA). MBA improves the differential-correction accuracy by averaging the position results from several different baselines. This technique can provide higher accuracy than any single baseline. Further, for long baselines (more than about 250 km), the usage of non-iono-free observables (e.g. L1-only or LW) leads to a higher accuracy compared to the commonly used iono-free (LC) combination.

PART 3: Stochastic Post-Processing Accuracy (SPPA) Predictor. If no reference- or correction data is available, the stochastic post-processing accuracy (SPPA) can be predicted during the real-time data collection. With the SPPA information the user can stop the data collection when the predicted post-processed accuracy reaches a desired level. For this purpose the real-time GNSS rover-engine is used as a SPPA-Predictor. The resulting error estimate is determined by only the rover data, entered into the RT-GNSS rover-engine in real-time. This means, that the SPPA-Predictor uses the internal error-propagation through the RT-GNSS rover-engine with the given a-priori error models, to compute an error estimate.

BRIEF DESCRIPTION OF THE DRAWINGS

These and other aspects and features of the present invention will be more readily understood from the embodiments described below with reference to the drawings, in which.

DETAILED DESCRIPTION

Overview

Figure 1:
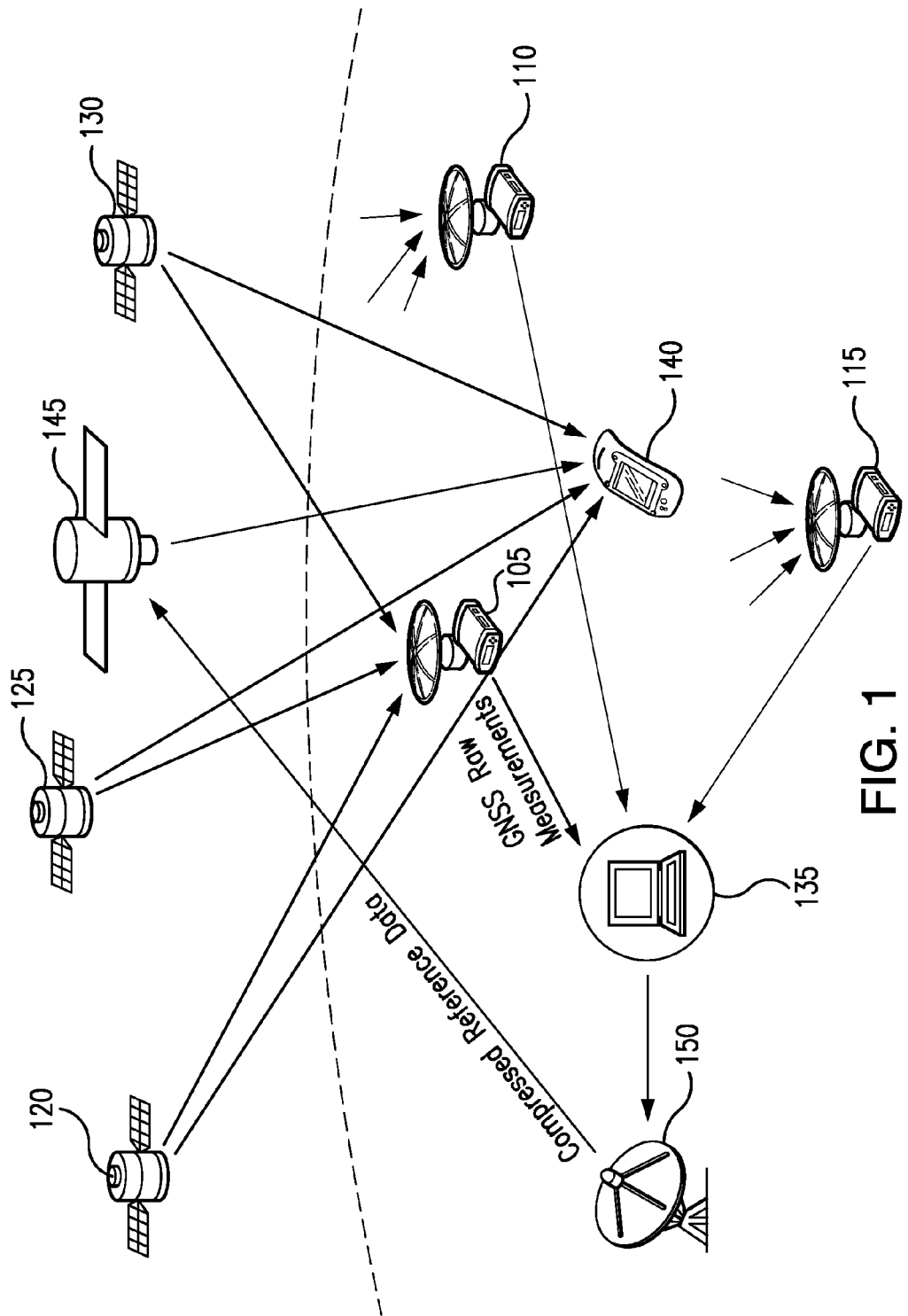
FIG. 1 shows the components and data flow of a Real-Time Fast Decimeter-Level GNSS positioning system, in accordance with an embodiment of the invention.

FIG. 1 shows an overview of the components and data flow of a real-time, fast, decimeter-level GNSS positioning system in accordance with an embodiment of the invention. Multiple GNSS reference stations, such as reference station 105, 110, 115 receive GNSS signals from multiple GNSS satellites, such as satellites 120, 125, 130. The GNSS reference stations provide GNSS data (e.g., raw measurements of the GNSS signals), via suitable communication links, to a real-time GNSS network server 135. The network server collects the GNSS data from many reference stations, processes the GNSS data (e.g., performs code-smoothing), and then compresses and transmits the compressed reference data for reception by any number of GNSS rover receivers 140, e.g., via an uplink station 150 to a communications satellite 145. Communications satellite 145 is, for example, geostationary Inmarsat satellite which broadcasts the reference data for reception by any number of GNSS rover receivers. A GNSS rover receiver receives the reference data, decompresses the reference data, synchronizes the reference data (interpolation/extrapolation of reference data), forms single differences and computes a float solution. The GNSS rover receiver can operate in either single-frequency mode or dual-frequency mode. The GNSS rover receiver can operate in a stop-and-go mode. The GNSS rover receiver can operate in a synchronized or propagated mode. A GNSS rover receiver, equipped with a real-time GNSS processing engine (rover engine) receives the reference data and is able to compute positions with decimeter-level accuracy in real-time, after a short convergence time, as described below.

Provision of the Reference Data

Figure 2:
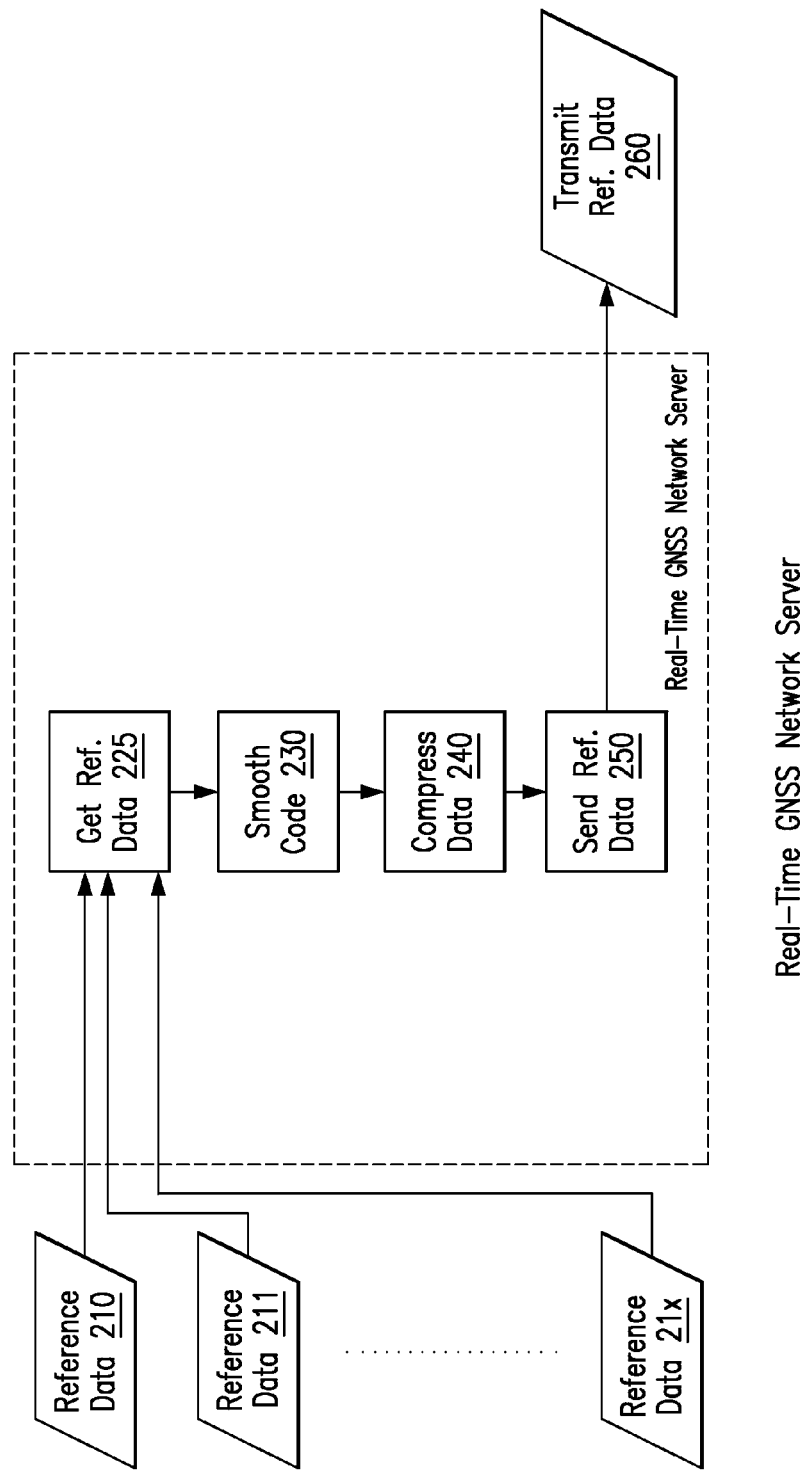
FIG. 2 shows the flowchart of the Real-Time GNSS Network Server, in accordance with an embodiment of the invention.

The RT-GNSS rover engine needs high quality reference data from one or more reference stations in real-time. FIG. 2 shows a RT-GNSS network server which collects GNSS data from many reference stations 210-21x, processes (e.g. performs code-smoothing 230), compresses 240 and broadcasts 260 the data. The simplest form of a RT-GNSS network server is a single reference station consisting of a GNSS receiver and a processing unit (e.g. Trimble NetRS, Trimble NetR5, etc.) in communication with the rover receiver via a suitable transmission medium (e.g. Internet, GSM, GPRS, terrestrial or satellite based radio, etc.).

Code-Smoothing (230). A smoothing algorithm is employed on the reference code measurements to substantially reduce multipath effects. This smoothing can be performed using all the reference data available until the current epoch. Smoothing merges 'absolute' pseudorange capability and 'relative' carrier phase capability. The GNSS pseudorange measurement is noisy but not ambiguous; the GNSS carrier-phase measurement is precise but ambiguous. Precise and unambiguous pseudorange measurement can be produced by combining these properties.

The method is to average the geometry-free, ionosphere-free code-minus-carrier observable, which essentially contains only multipath, noise, and ambiguity. If the tracking is continuous for a satellite for several hours, the noise and multipath can be effectively removed, giving an accurate ambiguity. The smoothed pseudorange at any epoch is recovered by adding the averaged ambiguity to the epoch value of the carrier phase combination used to compute the ambiguity. Thus the precision of the smoothed reference code will approach that of the carrier phase.

The observation equations for GNSS code and carrier-phase observations for the $i^{th}$ carrier frequency (for GPS i=1,2 currently) are $$\rho_i = R + \delta R + c(\delta t_r - \delta t_s) + T + \frac{\lambda_i^2}{\lambda_1^2} I + \varepsilon_{\rho_i} \quad (1)$$

$$\lambda_i(\phi_i + N_i) = R + \delta R + c(\delta t_r - \delta t_s) + T - \frac{\lambda_i^2}{\lambda_1^2} I + \varepsilon_{\phi_i}$$

where:
- $\rho_i$: Code/pseudorange measurement
- $\phi_i$: Carrier phase measurement
- R: Geometric range between the receiver and the satellite
- $\delta R$: Satellite orbit error
- c: Vacuum speed of light
- $\delta t_s$: Satellite clock error (including the relativistic correction)
- $\delta t_r$: Receiver clock error
- $N_i$: Carrier phase initial ambiguity
- $\lambda_i$: Wavelength
- I: Ionospheric error
- T: Tropospheric error
- $\varepsilon_{\rho_i}, \varepsilon_{\phi_i}$: Code and carrier multipath and measurement noise In the dual frequency case i=1,2, using the observation Equations (1), a divergence-free smoothing formula can be constructed as follows:

$$\rho_1 - \lambda_1 \phi_1 - 2\frac{\lambda_1^2}{\lambda_2^2 - \lambda_1^2}(\lambda_1 \phi_1 - \lambda_2 \phi_2) = -\lambda_1 N_1 - \quad (2)$$

$$2\frac{\lambda_1^2}{\lambda_2^2 - \lambda_1^2}(\lambda_1 N_1 - \lambda_2 N_2) = N_{s1}$$

$$\rho_2 - \lambda_2 \phi_2 - 2\frac{\lambda_2^2}{\lambda_2^2 - \lambda_1^2}(\lambda_1 \phi_1 - \lambda_2 \phi_2) = -\lambda_2 N_2 -$$

$$2\frac{\lambda_2^2}{\lambda_2^2 - \lambda_1^2}(\lambda_1 N_1 - \lambda_2 N_2) = N_{s2}$$

Where $$\frac{\lambda_1^2}{\lambda_2^2 - \lambda_1^2}[\lambda_1(\phi_1 + N_1) - \lambda_2(\phi_2 + N_2)] \quad (3)$$

is the ionospheric error on L1.

As long as there is no cycle slip, then the right side of Equation (2) is a constant. Code smoothing is based on this property; it accumulates the left side of Equation (2) and calculates the mean values $\tilde{N}_{s1}$ and $\tilde{N}_{s2}$ over multiple epochs. The smoothed pseudo-range at epoch ($t_k$) can be calculated as $$\rho_{s1}(t_k) = \lambda_1 \phi_1(t_k) + 2\frac{\lambda_1^2}{\lambda_2^2 - \lambda_1^2}(\lambda_1 \phi_1(t_k) - \lambda_2 \phi_2(t_k)) + \tilde{N}_{s1} \quad (4)$$

$$\rho_{s2}(t_k) = \lambda_2 \phi_2(t_k) + 2\frac{\lambda_2^2}{\lambda_2^2 - \lambda_1^2}(\lambda_1 \phi_1(t_k) - \lambda_2 \phi_2(t_k)) + \tilde{N}_{s2}$$

If the satellite is tracked continuously for an extended period of time without any cycle slip, then the smoothed pseudo-range will be as precise as the carrier phase observation. A huge reduction of noise level is achieved.

Compression (240). To achieve a low data rate any desired compression techniques can be used. As examples for the CMR-format see: N. TALBOT, *"Compact Data Transmission Standard for High-Precision GPS"*, white paper, Trimble Navigation, and for RTCM (Radio Technical Commission for Maritime Services) format see: *"RTCM Recommended Standards for Differential GNSS Service, Version 2.3 and 3.0"*.

Send and Transmit data (250, 260). The compressed reference data sent from the network server is transmitted or broadcasted in any suitable way (e.g. GSM, GPRS, terrestrial or satellite based radio, or any other suitable communication link).

Part 1

Real-Time GNSS Rover-Engine

Some embodiments in accordance with the invention provide a real-time GNSS rover-engine which enables a user to achieve two decimeter (1-sigma) horizontal accuracy over a short occupation time (more precisely the carrier lock duration) of two minutes with single- or dual-frequency differential carrier phase positioning for baselines up to several hundred kilometers. This is a great performance leap compared to current processing engines on the market, where the occupation time is usually several times as long for the same accuracy. To achieve the high accuracy, low occupation time goal, a number of innovative techniques have been developed, such as interpolation and extrapolation of the reference data to match the rover data, using the minimum-error combination for the dual-frequency case, using the L1 carrier phase and the L1 carrier phase plus L1 code combination with single-differencing to efficiently filter the single-frequency case, forward filtering with the application of the whitening of noise technique to remove redundant multipath states, and detection of movement of the rover during static periods. All these techniques will be discussed in detail below.

The field hardware is a single GNSS rover receiver, such as a Trimble GPS Pathfinder ProXH or Trimble GeoXH handheld GPS receiver, with or without optional external Zephyr antenna, or any other device with an integrated GNSS receiver (e.g. PDA or mobile phone).

Figure 3:
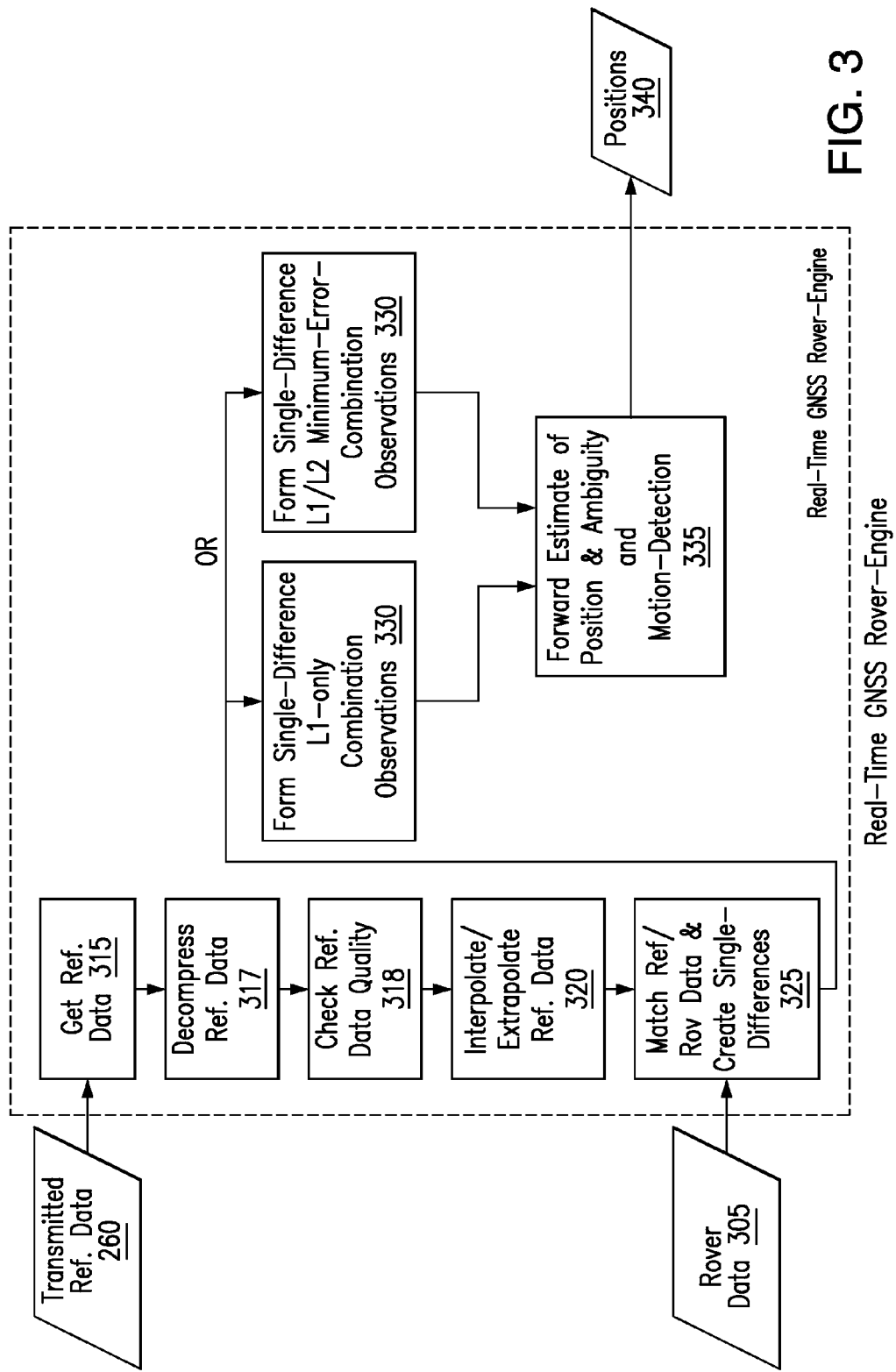
FIG. 3 shows the flowchart of the Real-Time GNSS Rover-Engine, in accordance with an embodiment of the invention.

Real-Time GNSS Rover-Engine Flowchart FIG. 3 is a flowchart of a real-time GNSS rover-engine 300 in accordance with an embodiment of the invention. It contains 7 basic modules for processing the current rover data 305 with the currently received reference data 260: (1) module 315 gets the broadcasted reference data 260, (2) module 317 decompresses the received reference data, (3) module 318 checks the quality of the reference data, (4) module 320 interpolates or extrapolates the reference data, (5) module 325 matches the reference and rover data and creates the single-differences, (6) module 330 forms the single-difference minimum-error-combination observations or the L1-only combination depending on dual- or single-frequency mode of the rover receiver, and (7) module 335 prepares a forward estimate of the position and ambiguity. Each module is explained below.

Module 1: Get reference data of several reference stations from the received broadcast signal 315.

The user (rover) does not need a dedicated reference receiver. Raw GNSS measurement data from one or more base stations, or from any public source, can be received in real-time via GSM, GPRS, terrestrial or satellite based radio transmission or other suitable communication link.

Module 2: Decompress the reference data 317.

The reference data may be compressed in any suitable format, for example, in the CMR-format see: N. TALBOT, "*Compact Data Transmission Standard for High-Precision GPS*", white paper, Trimble Navigation, and for RTCM (Radio Technical Commission for Maritime Services) format see: "*RTCM Recommended Standards for Differential GNSS Service, Version 2.3 and 3.0,*".

Module 3: Check reference data quality 318 (e.g. cycle-slip detection and repair).

Figure 4:
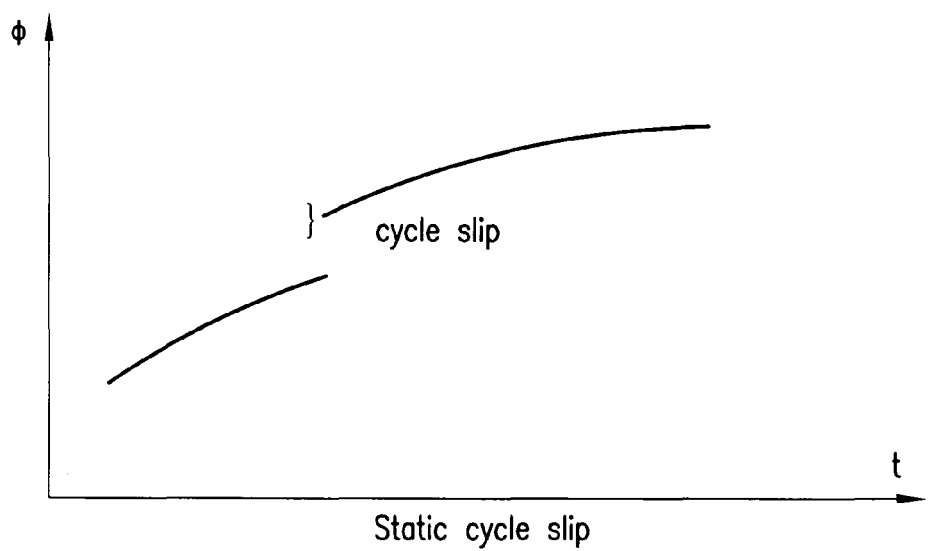
FIG. 4 illustrates the effect of a carrier-phase cycle slips causing a distinct jump in carrier-phase measurements.

Carrier-phase cycle slips can occur as a result of an interrupted carrier-phase tracking loop, causing a distinct jump in the carrier phase measurement, as shown in FIG. 4. Carrier-phase cycle slip can be detrimental to carrier phase positioning; for example, the above mentioned smoothing will suffer from cycle slips because every time there is a cycle slip, the right side of Equation (2) will change and thus the averaging of the left side of Equation (2) will then have to be reset, degrading the smoothing performance. If a cycle slip is encountered, the interpolation process also has to be reset and restarted, causing a loss of reference data for up to three epochs (the number of epochs to converge the Kalman-filter interpolator) of raw reference data (e.g., reference data is lost for 90 seconds if the reference data is at 30-second intervals). It is thus important to detect and repair these cycle slips. There are many prior art techniques for cycle slip repair. A detailed discussion on cycle slip detection and repair, ranging from carrier minus code, ionospheric residual and triple difference, is found for example at B. HOFMANN-WELLENHOF, GPS Theory and Practice, 2d. Ed., 1992, at Chapter 9. TEQC is a quality control check run by CORS which will show cycle slips in the reference-station data file. A rover receiver will also normally provide an indication of a cycle slip.

Module 4: Interpolate/extrapolate the reference data 320.

If the update rate of the received reference data is different from the update rate of the rover data, or if the epoch of the reference data does not match the epoch of the rover data, the reference data needs to be interpolated. Furthermore, in a real-time system the reference data arrives at the rover usually with a delay of a few seconds. To compute the current position of the rover from the last rover measurement immediately, extrapolation of the "aged" reference data to the current rover epoch is necessary. This real-time mode is often called "low-latency mode" and is discussed in LAPUCHA (1995) for example.

Figure 5:
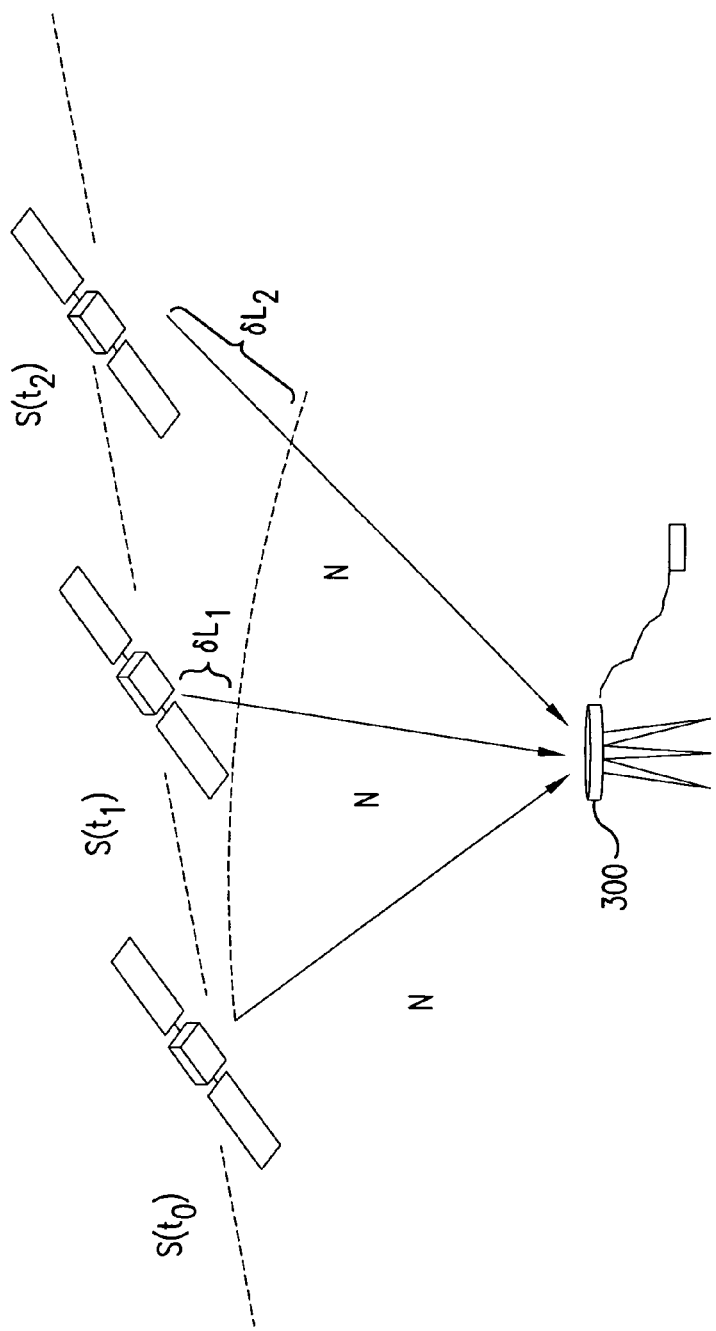
FIG. 5 illustrates a situation where reference data is available at epochs $t_0$ and $t_2$, and reference data at an intervening epoch $t_1$ is generated using interpolation in accordance with an embodiment of the invention.

The update rate of the reference data can be very slow (e.g. 30 sec), and the most usual update rate for rover receivers is 1 sec. So, if only matching epochs are used, much of the rover data information would be discarded. To overcome this problem, the reference data is interpolated from 30 sec intervals to 1 sec intervals. FIG. 5 illustrates a situation where reference data from a reference station 300 is only available at epochs $t_0$ and $t_2$ (30 seconds apart), and reference data at epoch $t_1$ is generated using interpolation in accordance with an embodiment of the invention.

A known technique for interpolating GPS data is described in MADER 2002. This technique uses a high-order polynomial (typically $8^{th}$ order). However, this approach suffers from the fact that a missing reference epoch or a cycle slip would prevent interpolation being done for up to the number of polynomial order epochs (if an $8^{th}$ order polynomial is used, then interpolation will not be possible for up to 8 epochs of reference epochs).

In contrast, the present invention employs an interpolation/extrapolation method in which the geometry is subtracted from the carrier-phase and code measurement using the ephemeris, the remaining geometry-free errors are interpolated (or modeled with a Kalman filter), and the geometry is added back to the interpolated/extrapolated geometry-free errors. This is possible because the remaining errors are fairly low frequency.

Figures 6A, 6B:
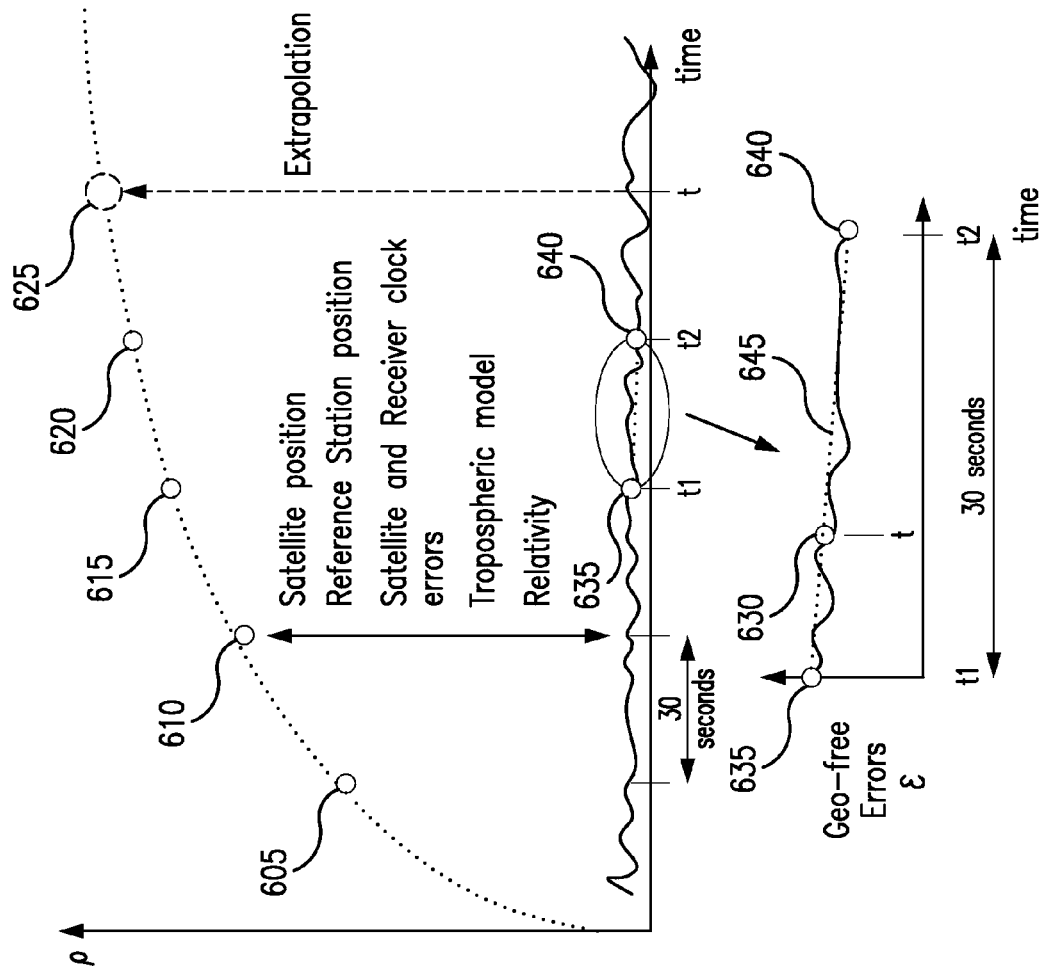
FIG. 6A and FIG. 6B illustrate a principle of interpolation in accordance with some embodiments of the invention.

FIGS. 6A and 6B illustrate a principle of interpolation and extrapolation in accordance with some embodiments of the invention. As shown in FIG. 6A, the code/pseudorange measurements 605, 610, 615, 620, 625 of the reference station, e.g., at discrete 30-second intervals, are a composite of known, mainly geometry-related elements (e.g., satellite position, reference station position, satellite and receiver clock error, modelled tropospheric effect, relativity) and unknown elements (e.g., satellite orbit/clock error, residual tropospheric error, ionospheric error, multipath, noise). Using the observation Equations (1), the known geometry-related elements are subtracted, leaving a residual error at each discrete time-point $t_j$ $$\varepsilon_{\rho_i}(t_j) = \rho_i(t_j) - R(t_j) - c[\delta t_r(t_j) - \delta t_s(t_j)] - T(t_j) - \frac{\lambda_i^2}{\lambda_1^2} I(t_j) \quad (5)$$

$$\varepsilon_{\phi_i}(t_j) = \lambda_i[\phi_i(t_j) + N_i] - R(t_j) - c[\delta t_r(t_j) - \delta t_s(t_j)] - T(t_j) + \frac{\lambda_i^2}{\lambda_1^2} I(t_j)$$

A simple interpolation approach in accordance with an embodiment of the invention is to determine a linear interpolation for example at 1-second intervals between the discrete samples at 30-second intervals, e.g., interpolate a residual 630 at time t between residual 635 at $t_1$ and residual 640 at $t_2$ as illustrated in FIG. 6B.

With the phase-change-rate between two time points $t_1$ and $t_2$ $$\delta\varphi_i = \lambda_i \delta\phi_i = \frac{\varepsilon_{\phi_i}(t_2) - \varepsilon_{\phi_i}(t_1)}{t_2 - t_1} \quad (6)$$

the interpolated phase residual at an intermediate time point t is $$\epsilon_{\phi_i}(t) = \epsilon_{\phi_i}(t_1) + (t - t_1)\delta\phi_i \quad (7)$$

For the dual frequency case i=1,2 the phase change rate can be split into two parts. A frequency independent (geometric) part $$\delta\varphi_G = -\frac{\lambda_2^2}{\lambda_1^2 - \lambda_2^2}\delta\varphi_1 + \frac{\lambda_1^2}{\lambda_1^2 - \lambda_2^2}\delta\varphi_2 \quad (8)$$

and a frequency dependent (ionospheric) part $$\delta\varphi_I = \frac{\lambda_1^2}{\lambda_2^2 - \lambda_1^2}(\delta\varphi_1 - \delta\varphi_2). \quad (9)$$

With that, the code-change-rate can be expressed as $$\delta\rho_i = \delta\varphi_G + \frac{\lambda_i^2}{\lambda_1^2}\delta\varphi_I \quad (10)$$

and the interpolated code residual at an intermediate time point t is $$\epsilon_{\rho_i}(t) = \epsilon_{\rho_i}(t_1) + (t - t_1)\delta\rho_i. \quad (11)$$

Now, with the interpolated code- and phase residual, the code and the phase at the intermediate time point t is computed as $$\rho_i(t) = R(t) + c[\delta t_r(t) - \delta t_s(t)] + T(t) + \frac{\lambda_i^2}{\lambda_1^2} I(t) + \varepsilon_{\rho_i}(t) \quad (12)$$

$$\lambda_i[\phi_i(t) + N_i] = R(t) + c[\delta t_r(t) - \delta t_s(t)] + T(t) - \frac{\lambda_i^2}{\lambda_1^2} I(t) + \varepsilon_{\phi_i}(t)$$

Extrapolation can be performed simply by replacing $t_1$ with $t_2$ in Equation (7) and (11) with $t > t_2$ (see 625 in FIG. 6A for illustration).

The advantage of this interpolation/extrapolation scheme is that the code is interpolated/extrapolated using the phase-change-rate. This is more precise than a code-only based interpolation of the code measurements.

Another approach, in accordance with an embodiment of the invention, is to interpolate for example at 1-second intervals between the discrete samples at 30-second intervals using a linear Kalman filter. The linear function of the Kalman filter is modelled by its bias (offset and change rate). The Kalman filter filters out noise, possibly more effectively than a linear interpolation, as it is a weighted interpolation (adjustment). A minimum of two samples allows a linear interpolation, while more samples allows reduction of errors. The Kalman filter is run on the small residual to a time point of interest (e.g., a desired 1-second interval point t) and the change rate is obtained from the Kalman filter for use as a linear interpolation factor from a reference-sample time to that point.

Figure 7:
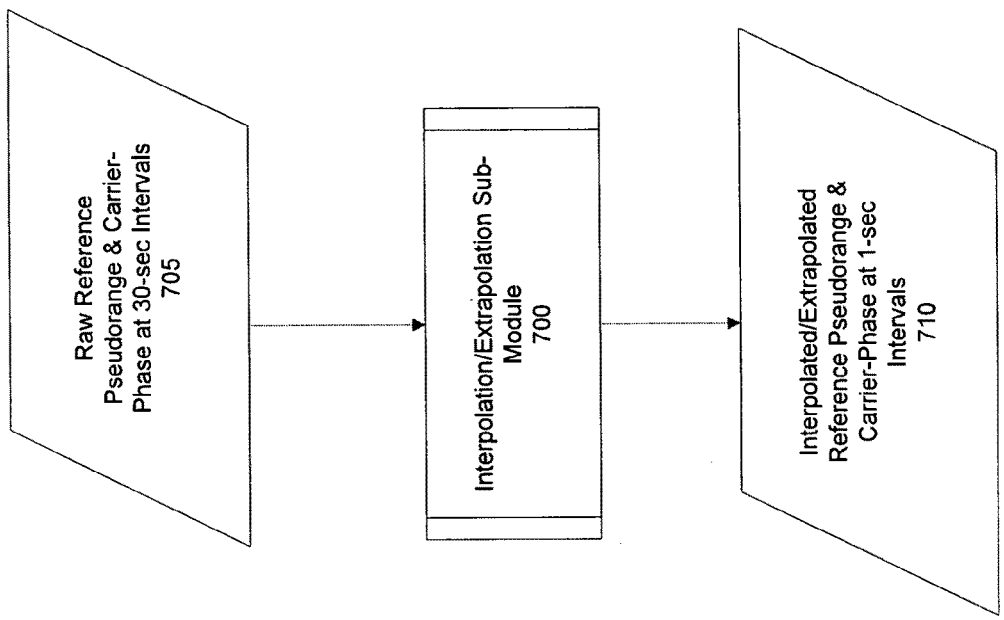
FIG. 7 the input and output data of an interpolation submodule in accordance with some embodiments of the invention.

FIG. 7 shows the input and output data of the interpolation/extrapolation sub-module 700 of the interpolation/extrapolation module 320. The input data 705 are dual-frequency pseudorange and carrier-phase measurements from the reference stations, typically at 30-second intervals. The output data from interpolation sub-module 710 are pseudorange and carrier-phase measurements at, for example, one-second intervals.

Figure 8:
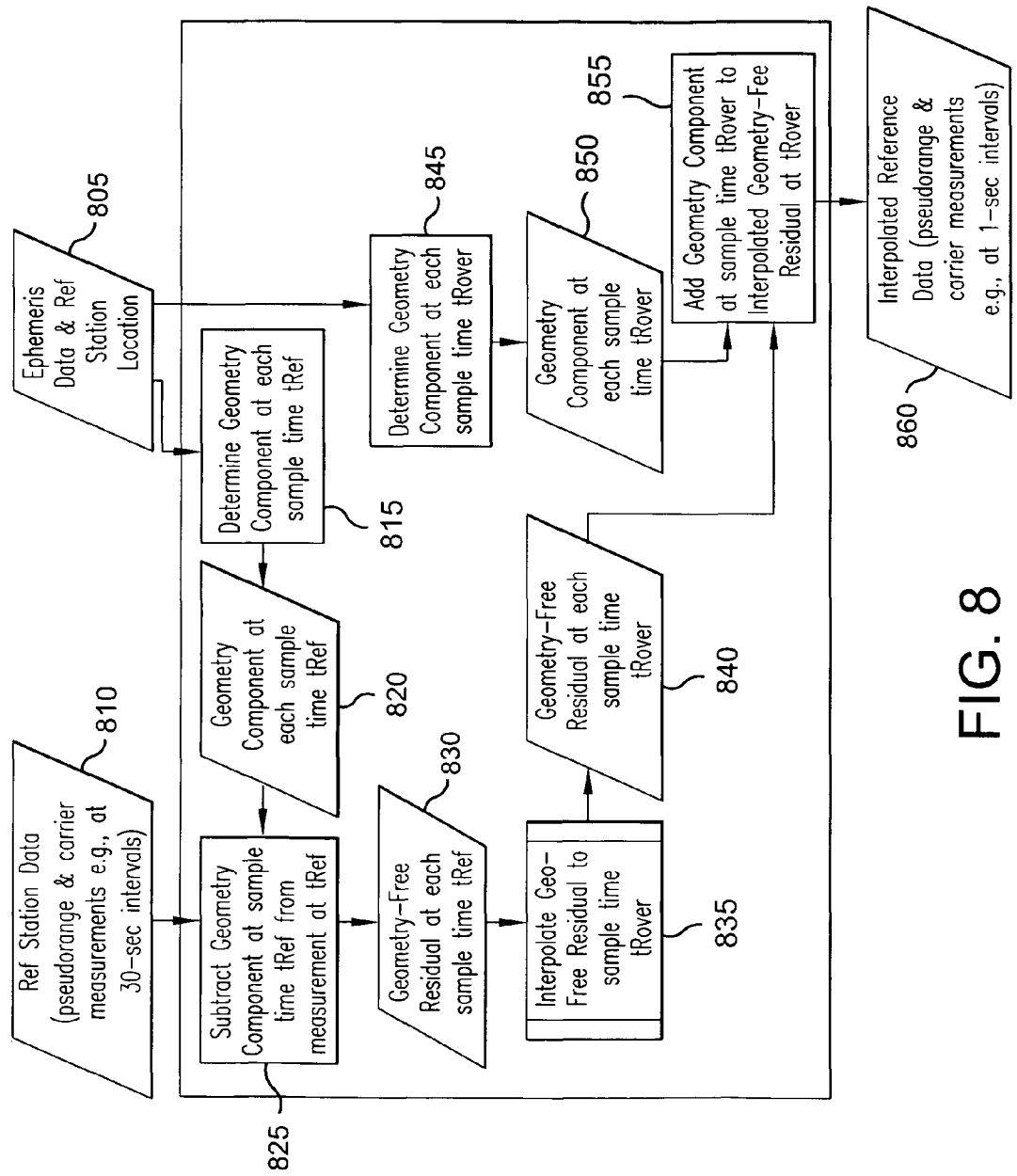
FIG. 8 is a flow chart showing a process for interpolation of reference station data in accordance with some embodiments of the invention.

FIG. 8 is a flow chart showing a process 800 for interpolation/extrapolation of reference station data in accordance with some embodiments of the invention. Ephemeris data and reference-station location data 805 are known or provided. Reference-station data 810, e.g., pseudorange and dual-frequency carrier measurements at 30-second intervals, is accessed. The ephemeris data and reference station location are used at 815 to determine a geometry component 820 of the reference-station measurement at each reference-station-measurement time $t_{Ref}$. For each reference-station-measurement time $t_{Ref}$ of interest, the geometry component is subtracted from the reference-station measurement at 825 to produce a geometry-free residual 830. These residuals are supplied to an interpolation/extrapolation process 835 (e.g., a linear interpolator/extrapolator, or a linear Kalman-filter which produces a weighted interpolation/extrapolation) to prepare geometry-free residuals 840 at times $t_{Rover}$ corresponding to the sample times of the rover measurements to be processed (e.g., at 1-second intervals). The ephemeris data and reference station location are used at 845 to determine a geometry component 850 of the reference-station measurement at each rover-data-sample time $t_{Rover}$ (e.g., at 1-second intervals). For each rover-data-sample time $t_{Rover}$, the interpolated/extrapolated geometry-free residual and the determined geometry component are added at 855 to produce an interpolated/extrapolated reference measurement 860.

Module 5: Match reference and rover data and create the single differences 325.

Module 325 (see FIG. 3) matches the rover data 305 and the inter-/extrapolated reference data 320 at each epoch, and creates the single differences. After this, differential processing can start. The next several sections will discuss innovative techniques developed for this purpose.

Module 6: Form the single difference minimum-error-combination observations 330, or the L1-only combination depending on dual- or single-frequency mode of the rover receiver.

The reference data usually contains dual-frequency observables, L1 and L2. However the rover can provide either dual frequency or single frequency observables, depending on the configurations and the hardware. For example, the Trimble Geo-Explorer 2005 series and Trimble GPS Pathfinder ProXH and Trimble GeoXH handheld GPS receivers provide single-frequency observables when used with the internal antenna and provide dual-frequency observables when used with the optional external Zephyr antenna. Depending on the number of frequencies available (e.g., single- or dual-frequency for L1/L2 GPS), different observation combinations and parameterization schemes are formed. Regardless of the number of rover receiver frequencies, two types of observations are used in the final filtering: one code combination and one carrier phase combination.

Dual Frequency. If both L1 and L2 code and carrier-phase data is available, then two types of observation combinations are formed. The first is the so-called minimum-error code-minus-carrier geometry-free combination. The second is the minimum-error carrier-phase combination. These can be expressed as follows:

$$\rho_{cc} = (c\rho_1 + (1-c)\rho_2) - (a\lambda_1\phi_1 + b\lambda_2\phi_2)$$

$$\phi_{cc} = a\lambda_1\phi_1 + b\lambda_2\phi_2 \quad (13)$$

where
a: is the combination coefficient for the L1 carrier-phase
b: is the combination coefficient for the L2 carrier-phase
c: is the combination coefficient for L1 pseudo-range
$\rho_{cc}$: is the minimum-error code minus carrier combination
$\phi_{cc}$: is the minimum-error carrier combination.

The coefficients are determined based on priori knowledge of the carrier-phase noise, pseudo-range noise, baseline-length, and ionospheric content. For very long baselines, where the ionosphere becomes the dominant differential error source, the minimum-error combinations tend to be ionosphere-free combinations, on both carrier and code.

Figure 9:
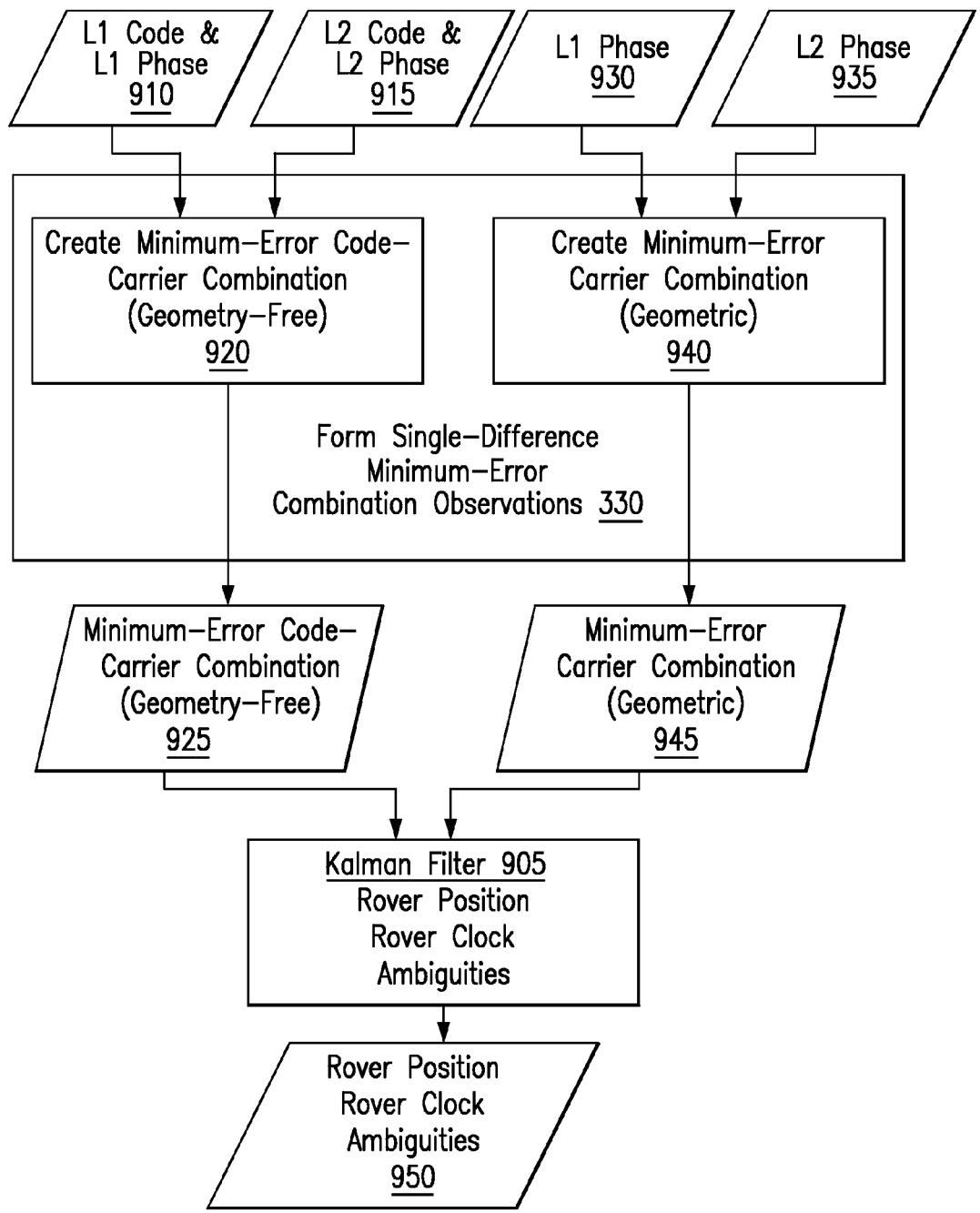
FIG. 9 shows an exemplary embodiment of a module which forms the minimum-error-combinations for dual-frequency GNSS data in accordance with some embodiments of the invention.

FIG. 9 shows an exemplary embodiment of a module 330 which forms the minimum-error combinations for dual-frequency GNSS data and feeds these to a Kalman filter 905 which performs the filtering. L1-code and L1-phase data 910, and L2-code and L2-phase data 915 are supplied to a sub-module 920 which creates a geometry-free minimum-error code minus carrier combination 925. L1-phase data 930 and L2-phase data 935 are supplied to a sub-module 940 which creates a geometric minimum-error combination 945. These combinations 925 and 945 are supplied to a static-mode Kalman filter 905 having states for Rover Position $x_1, y_1, z_1$
Rover Clock 1 $T_1$ (rover clock during epoch 1)
Rover Clock 2 $T_2$ (rover clock during epoch 2)
L1 ambiguities $N_{1-1} \ldots N_{1-N}$ (one per satellite for L1)
L2 ambiguities $N_{2-1} \ldots N_{2-N}$ (one per satellite for L2)

The filter's rover clock state is toggled between T1 and T2 from one epoch to the next. The ambiguities change only when reset due to cycle slip. The Kalman filter provides as outputs 950 the rover position values and the ambiguities.

In an alternate embodiment, the Kalman filter of FIG. 9 is enhanced for kinematic mode by adding further states for rover position and rover clock so that the states are
- Rover Position 1 $x_1, y_1, z_1$ (rover position during epoch 1)
- Rover Clock 1 $T_1$ (rover clock during epoch 1)
- Rover Position 2 $x_2, y_2, z_2$ (rover position during epoch 2)
- Rover Clock 2 $T_2$ (rover clock during epoch 2)
- L1 ambiguities $N_{1-1} \ldots N_{1-N}$ (one per satellite for L1)
- L2 ambiguities $N_{2-1} \ldots N_{2-N}$ (one per satellite for L2)

The filter's rover clock state is toggled between T1 and T2 from one epoch to the next. When processing a current epoch, the Kalman filter keeps track of the rover position x, y, z for the epoch previously processed and determines whether the rover position has changed. When the rover has moved from the previous epoch, the rover position states are toggled between $x_1, y_1, z_1$ and $x_2, y_2, z_2$ to operate the filter in a kinematic mode. When the rover has not moved from the previous epoch, the rover position states are not toggled and the filter is thus operated in a static mode.

Figure 10:
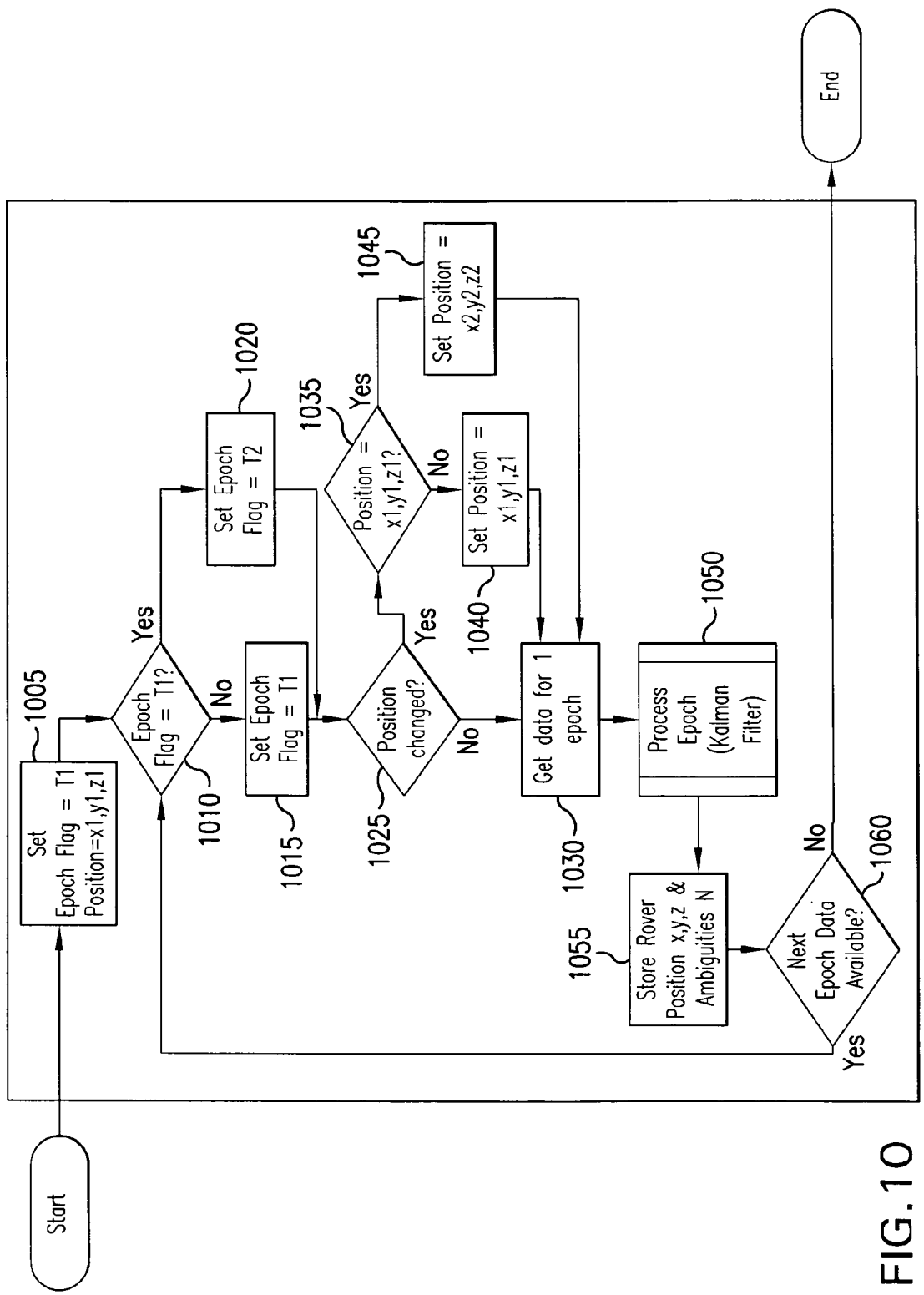
FIG. 10 is a flow chart showing operation of a Kalman filter with toggling of position and epoch in accordance with some embodiments of the invention.

FIG. 10 is a flow chart showing operation of Kalman filter 905 with toggling of position and epoch in accordance with some embodiments of the invention. At 1005 an epoch flag (rover clock) is initialized to T1 and rover position is initialized to $x_1, y_1, z_1$. At 1010 the epoch flag is checked and, if not set to T1 is toggled at 1015 to T1. If at 1010 the epoch flag is set to T1 then it is toggled at 1020 to T2. At 1025 a check is made of the Kalman filter's position states to determine whether position has changed more than a predetermined amount. If no, then data for an epoch is retrieved at 1030. If yes, then at 1035 the position is checked and, if not set to $x_1, y_1, z_1$ it is set at 1040 to $x_1, y_1, z_1$. If position is found at 1035 to be set to $x_1, y_1, z_1$ then at 1045 it is toggled to $x_2, y_2, z_2$. After toggling the position at 1040 or 1045, data for an epoch is retrieved at 1030. After retrieving data for an epoch at 1030, the epoch of data is processed at 1050 in a Kalman filter. The rover position and ambiguities are stored at 1055. At 1060 a check is made for a next epoch of data and, if available, the process returns to 1010.

Single Frequency. A single frequency rover receiver provides only $L_1$-code and L1-carrier-phase measurements. In this case the following set of observables is used:

$$P_1 = (\rho_1 + \lambda_1 \phi_1)/2$$

$$\Phi_1 = \lambda_1 \phi_1 \quad (14)$$

For the L1-pseudo-range measurement the $(\rho_1 + \lambda_1 \phi_1)/2$ combination is used, which is ionosphere-free but ambiguous. This combination is found to be ionosphere-free since the ionospheric-error has the same magnitude but opposite sign on the L1-code and L1-carrier observations.

Because of the code propagates with the group-velocity (delayed) and the phase with the phase-velocity (advanced), this combination is sometimes called GRAPHIC (Group and Phase Ionospheric Correction, YUNCK 1996).

The $(\rho_1 + \lambda_1 \phi_1)/2$ combination is known to be used in the context of SPP (Single-Point-Positioning: un-differenced code/phase positioning of a single GNSS-receiver, meter-level accuracy) using L1-only observations (YUNCK 1996, LEUNG 2003, GILL 2004, CHEN 2005, SIMSKY 2006), of PPP (Precise-Point-Positioning: processing of un-differenced code and carrier-phase observations of a single GNSS-receiver with precise satellite orbits and clocks, submeter to decimeter/centimeter accuracy) using dual-frequency observations (GAO 2004), and of triple-differenced positioning without floating ambiguities/solutions (REMONDI 1994).

GAO (2004) uses the much noisier iono-free LC-phase instead of the L1-phase, because he deals with dual-frequency observations. SIMSKY (2006) is using the $(\rho_1 + \lambda_1 \phi_1)/2$ combination together with the L1-code $(\rho_1)$ for L1-only positioning. However, the new observable set (14) that we are using—the $(\rho_1 + \lambda_1 \phi_1)/2$ combination together with the L1-carrier-phase $(\lambda_1 \phi_1)$—has not previously been proposed or used for standalone- (un-differenced) or differential-positioning with float-ambiguities/solutions using the L1-only observations of a GNSS-receiver.

The new set of observables (14), used here at the first time, is less noisy compared to other observable-sets or combinations. Hence it gives more accurate position results in a much shorter convergence time, in both cases: standalone (un-differenced) positioning and differential positioning with float-ambiguities using the L1-only observations of a GNSS-receiver, and that is mainly important for real-time fast decimeter-level GNSS positioning, in accordance with some embodiments of this invention.

Furthermore, the ionospheric-error of the L1-carrier-phase measurement $(\lambda_1 \phi_1)$ can be reduced or compensated, using any real-time source of ionospheric corrections (e.g. the public services WAAS, EGNOS, etc.).

The new set of observables (14) uses the GPS L1-code and L1-carrier-phase measurements as an example. However, any other GNSS single-frequency code and carrier-phase measurements can be used in the same way. Also different single-frequency measurements of different GNSS satellites can be used simultaneously in a receiver.

Figure 11:
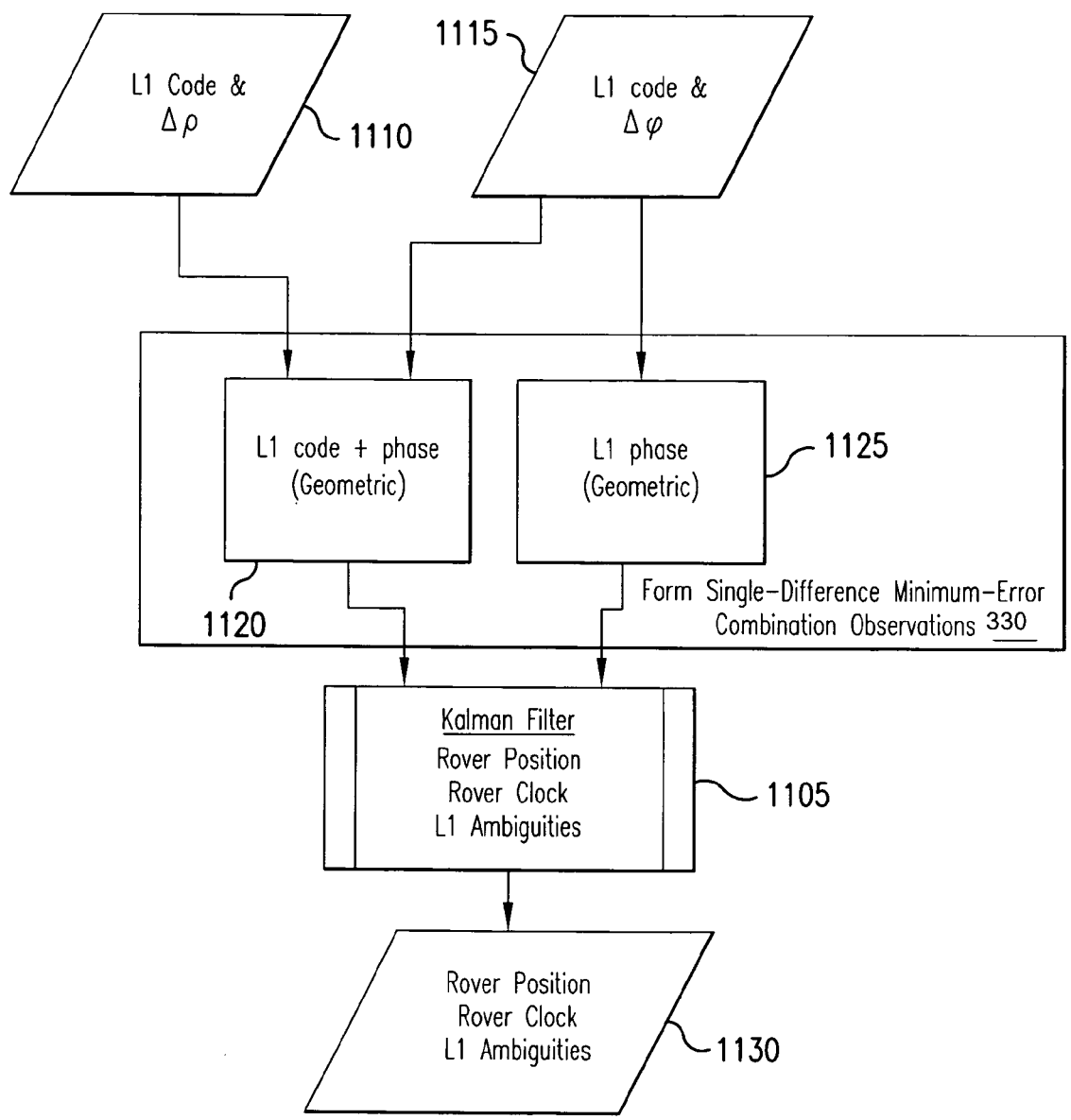
FIG. 11 shows an exemplary embodiment of a module which forms the minimum-error-combinations for single-frequency GNSS data in accordance with some embodiments of the invention.

FIG. 11 shows an exemplary embodiment of a module 230 which forms the L1-only single-difference GNSS observations and feeds these to a Kalman filter 1105 which performs the filtering. Single-differenced L1-code and L1-phase data 1110 (single differences between rover data and interpolated and super-smoothed reference data) are supplied to a sub-module 1120 which prepares the geometric L1-code plus L1-phase combination. Single-differenced L1-phase data 1115, which is geometric, is supplied via an L1-phase sub-module 1125. The main error in the single-differenced L1-code plus L1-phase combination is multipath error, which is time-correlated, besides the a priori unknown (time-constant) ambiguity which is estimated by the Kalman filter.

Figure 12:
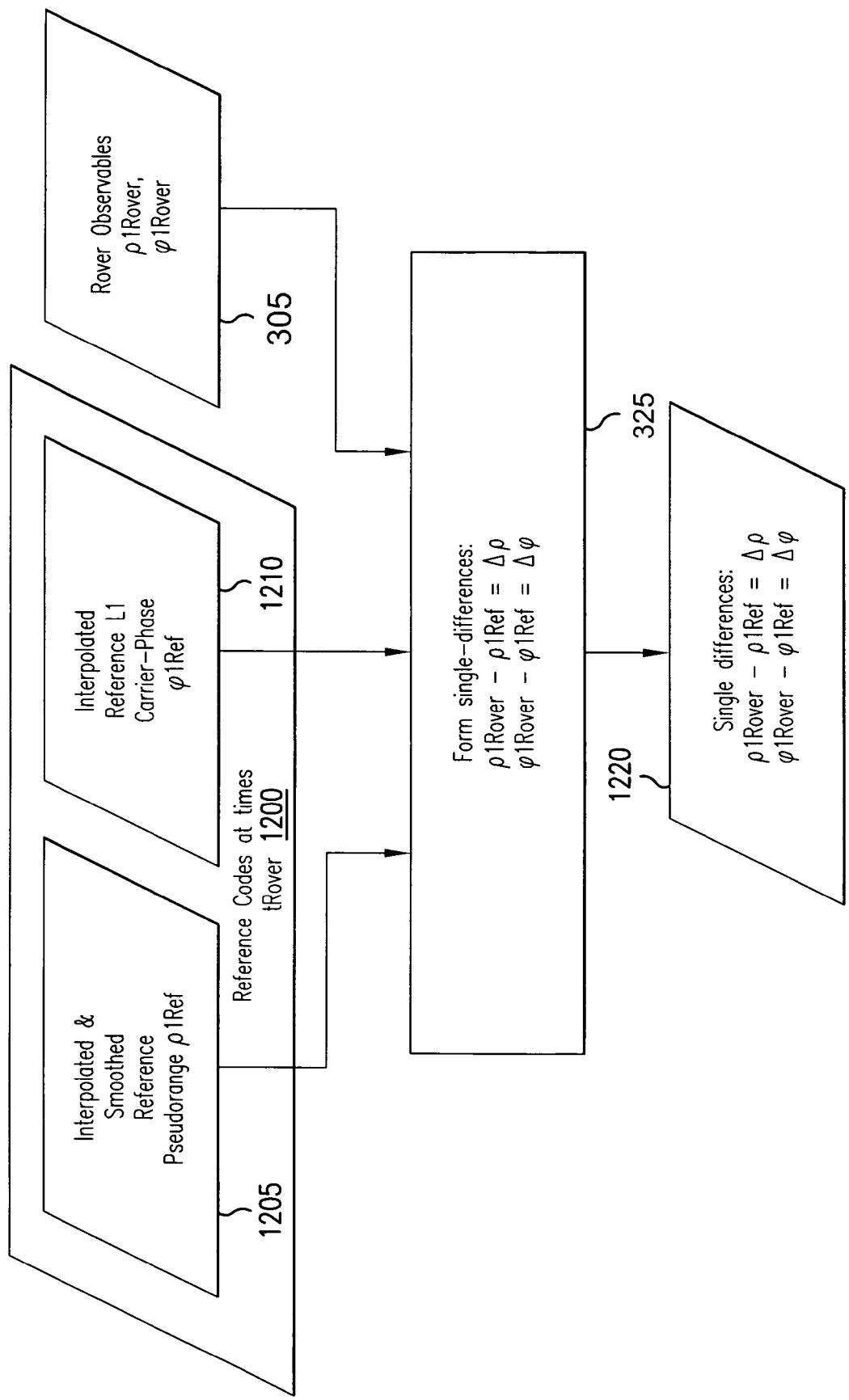
FIG. 12 shows in more detail the process of forming single differences for single-frequency GNSS data in accordance with some embodiments of the invention.

FIG. 12 shows in more detail the process of forming single differences for L1-only GNSS data. Interpolated/extrapolated and smoothed reference L1-pseudorange data 1205 and interpolated/extrapolated reference L1-carrier-phase data 1210 and the L1 rover observables 205 are supplied to a process which forms single differences 1220 for the L1-pseudorange and L1-carrier-phase.

The Kalman filter for single-frequency rover data is like the geometry filter described in U.S. patent application Ser. No. 10/696,528 (VOLLATH U., "Ambiguity Estimation of GNSS Signals for Three or more Carriers"), except that it has two observables per epoch.

The L1-code plus L1-phase differences and the L1-phase differences are supplied to a Kalman filter having states for
- Rover Position 1 $x_1, y_1, z_1$ (rover position during epoch 1)
- Rover Clock 1 $T_1$ (rover clock during epoch 1)
- Rover Position 2 $x_2, y_2, z_2$ (rover position during epoch 2)
- Rover Clock 2 $T_2$ (rover clock during epoch 2)
- L1 ambiguities $N_{1-1} \ldots N_{1-N}$ (one per satellite for L1)

The filter's rover clock state is toggled between $T_1$ and $T_2$ from one epoch to the next. When processing a current epoch, the Kalman filter keeps track of the rover position "x, y, z" for the epoch previously processed and determines whether the rover position has changed. When the rover has moved from the previous epoch, the rover position states are toggled between "$x_1, y_1, z_1$" and "$x_2, y_2, z_2$" to operate the filter in a kinematic mode. When the rover has not moved from the previous epoch, the rover position states are not toggled and the filter is thus operated in a static mode. The ambiguities change only when reset due to cycle slip. The Kalman filter provides as outputs the rover position values and the ambiguities. The flow chart of FIG. 10 also applies for toggling of position and epoch for the L1-only case; the Kalman filter states for processing L1-only rover data differ from those for processing of L1/L2 dual-frequency rover data (for L1-only the ambiguities are of L1 and for dual-frequency the ambiguities are of minimum-error L1/L2 combination; see U.S. patent application Ser. No. 10/696,528 (VOLLATH U., "Ambiguity Estimation of GNSS Signals for Three or more Carriers") and SJÖBERG 1990).

Module 7: Prepare the forward estimate of the position and ambiguity and motion detection 335.

GPS carrier and code observations include not only white noise, but also colored noise (non-Gaussian errors), for example, multipath. Multipath error on the code observations can be up to tens of meters and on the carrier phase can be up to several centimeters. The multipath errors typically have a time constant of tens of seconds. To achieve the highest processing accuracy, the multipath should be properly accounted for. There are two ways to take care of this. The first is via state augmentation where an additional multipath state is estimated in the Kalman filter; the second is the "whitening of noise" technique, where the observation of the current epoch is differenced with the observation of the previous epoch via a correlation coefficient. The first method is more expensive from a computational load perspective and is thus not preferred. The second has proven its efficiency.

The basic principle of this "whitening of noise" technique is demonstrated as follows. Assuming the GPS carrier phase observation at epoch to is $L_0$ and at epoch $t_1$ is $L_1$, and the multipath on the carrier phase is found to be a first order Gauss-Markov process having a time constant of $t_c$, then the following differenced observation is found to be white:

$$\phi'_1 = \phi_1 - e^{\frac{t_1-t_0}{t_c}} \phi_0 \quad (15)$$

t=0'-e (15)

By properly taking into account the stochastic nature of the multipath, the algorithm provides optimal position accuracies and reduces the Kalman filter's convergence time by reducing the number of filter states to 8 plus N (where N is the number of satellites) from the 4 plus 4N states of the conventional Kalman filter approach.

One implication of this "whitening of noise" technique is that since the observation contains observation not only from this epoch, but also from the prior epoch, the estimated states also have to contain not only the position states (x,y,z) from this epoch, but also position states from previous epoch. So the complete state vector is:

$$(x_1, y_1, z_1, t_1, x_0, y_0, z_0, t_0, N_1, N_2 \ldots N_n) \quad (16)$$

Where $x_1, y_1, z_1, t_1$: rover position & rover clock error states of current epoch $x_0, y_0, z_0, t_0$: rover position & rover clock states of previous epoch $N_1, N_2 \ldots N_n$: ambiguity states for satellite 1 to satellite n.

The complete result of the forward processing is $$C_{pf}, C_{af}, C_{paf}, p_f, a_f \quad (17)$$

where $a_f$: forward ambiguity estimate
$p_f$: forward position estimate
$C_{af}$: forward ambiguity variance-covariance (VC) matrix
$C_{af}$: forward position VC matrix
$C_{paf}$: forward position ambiguity covariance matrix Motion Detection (detection of rover movement during periods reported by the user as static). In many cases the user provides wrong stop-and-go information. This means that the rover is moving during a period in which the user says the rover to be static. Naturally this will cause a large error in the resulting static position computed with the real-time GNSS rover-engine. To solve this problem, rover movement can be detected by checking the position-difference of the current and the previous epoch in the Kalman-filter.

In accordance with embodiments of the invention, the Kalman filter states already include the rover positions of the current epoch and the previous epoch (see Equation (16)). These are provided for the "whitening of noise" technique to model multipath and residual ionosphere as discussed above. These positions can be used to directly compute the estimated motion of the rover between the two latest epochs, using the relation $$\dot{r} = \frac{|\vec{r}(t_i) - \vec{r}(t_{i-1})|}{t_i - t_{i-1}} \quad (18)$$

where $\vec{r}(t_i) = (x_i, y_i, z_i)$ is the position at the current time $t_i$ and $\vec{r}(t_{i-1}) = (x_{i-1}, y_{i-1}, z_{i-1})$ is the position at the previous time $t_{i-1}$. The current position is computed from the previous position using the decorrelated delta-phase observable $\phi(t_i) - a\phi(t_{i-1})$, with the decorrelation-coefficient a.

Figure 13:
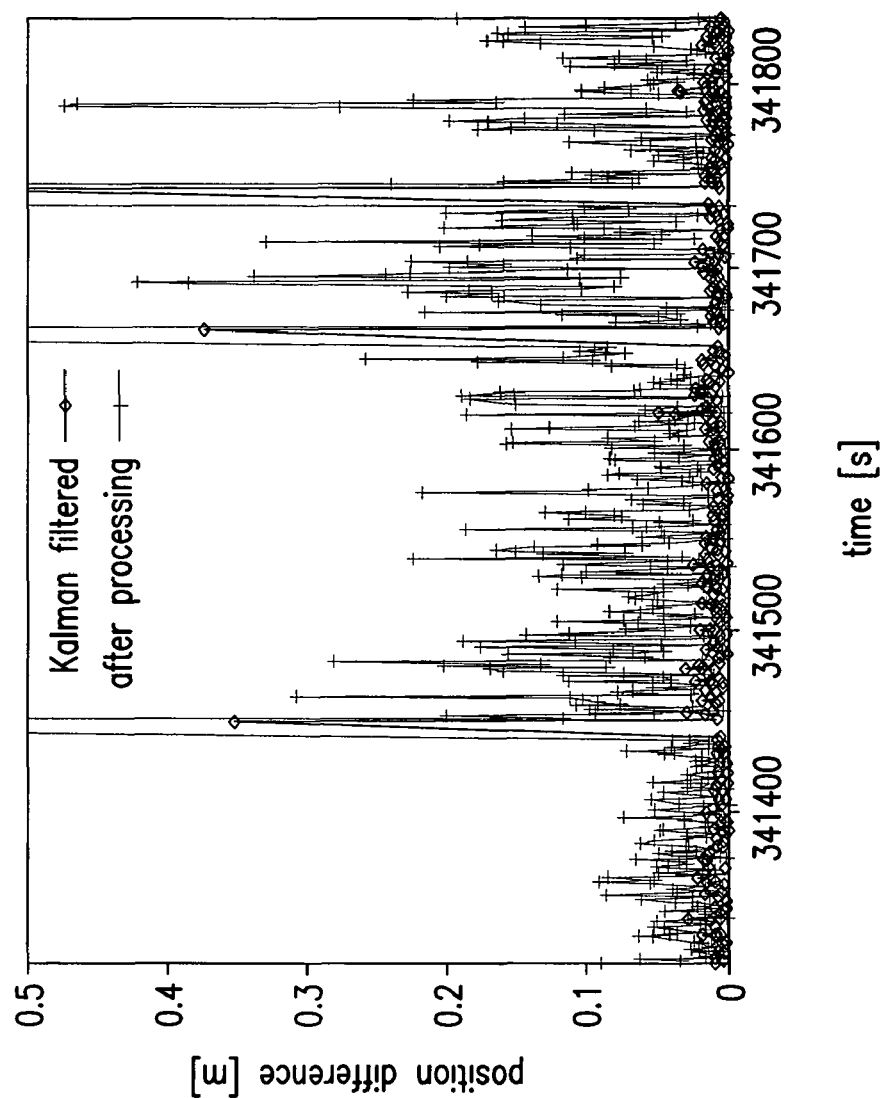
FIG. 13 shows the position differences of the "Kalman-filtered" motion detection method compared with the position differences after processing.

The "Kalman filtered" curve in FIG. 13 shows the great improvement in sensitivity of this motion detection method, compared to the simple computation of the position differences after processing. Velocities of about 5 cm/s or greater can be detected and reliably separated from the noisy background. If in a given stop-and-go interval $\dot{r}>0.1$ m/s (for example as in FIG. 13) the interval is marked as invalid or non-static. The entire interval is then processed in kinematic mode, or the longest static sub-interval is determined and processed in static mode.

Part 2

Long Distance Multi Baseline Averaging (MBA)

In accordance with some embodiments of the invention, MBA improves differential-correction accuracy by averaging the position-determination results from several different baselines. This technique can provide higher accuracy than any single baseline. It also has several advantages over typical network modeling methods: it works well over long baseline distances, is more tolerant of imprecise base coordinates, and is suited to ad-hoc combinations of base stations.

Disadvantages of VRS for long baselines (>300 km). Differential correction is performed by applying corrections to the satellite measurements collected at the roving GNSS (e.g. GPS) receiver. These corrections are determined in one of two ways. A single, stationary GPS base station at a known coordinate can be used to calculate the corrections. Or a network modeling method may be used, which uses a number of base stations around the area, and uses their known coordinates and their satellite measurements to create a model of the various error components over the relevant period of time. This model is then used to interpolate the corrections at the rover positions, which are then applied. This network modeling technique is also known as a VRS (Virtual Reference Station).

A VRS provides more accurate corrections than a single base station. However there are some disadvantages. Usually the base stations cannot be too far apart: about 70 km is the limit for RTK-VRS (real-time kinematic virtual reference station), and about 300 km for DGPS-VRS (differential GPS virtual reference station). The reference positions of the base stations must be very accurately known; otherwise the model can fail to initialize. The rover should be well inside the coverage area of the base station model, but this is not always possible, for example on a coast. Also, the network of base stations takes time to configure and initialize, and so is not suited to ad-hoc use. Lastly, the modeling requires preferably 5 base stations, but in many locations there are fewer available. Multi-baseline averaging/adjustment (MBA) has none of those disadvantages.

MBA method: Given m reference stations, for each reference station i={1, ..., m} a corrected position with the coordinates ($\phi_i$, $\lambda_i$, $h_i$) can be computed using an embodiment of the post-processing engine described herein. To reduce the deviation from the true position ($\phi_0$, $\lambda_0$, $h_0$), these corrected positions can be averaged, using a weighting function proportional to the quality of the positions. A good choice for the weighting function is the inverse covariance $1/\sigma^2$, which depends already on the baseline-length. The averaged latitude $\bar{\phi}(t_j)$, longitude $\bar{\lambda}(t_j)$ and height $\bar{h}(t_j)$ at the epoch $t_j$ are then $$\bar{\varphi}(t_j) = \frac{1}{\sum_{i=1}^{m} w_i} \sum_{i=1}^{m} w_i \varphi_i(t_j), \; w_i = \frac{1}{\sigma_i(\varphi_i)^2} \quad (19)$$

$$\bar{\lambda}(t_j) = \frac{1}{\sum_{i=1}^{m} w_i} \sum_{i=1}^{m} w_i \lambda_i(t_j), \; w_i = \frac{1}{\sigma_i(\lambda_i)^2} \quad (20)$$

$$\bar{h}(t_j) = \frac{1}{\sum_{i=1}^{m} w_i} \sum_{i=1}^{m} w_i h_i(t_j), \; w_i = \frac{1}{\sigma_i(h_i)^2} \quad (21)$$

Figure 14:
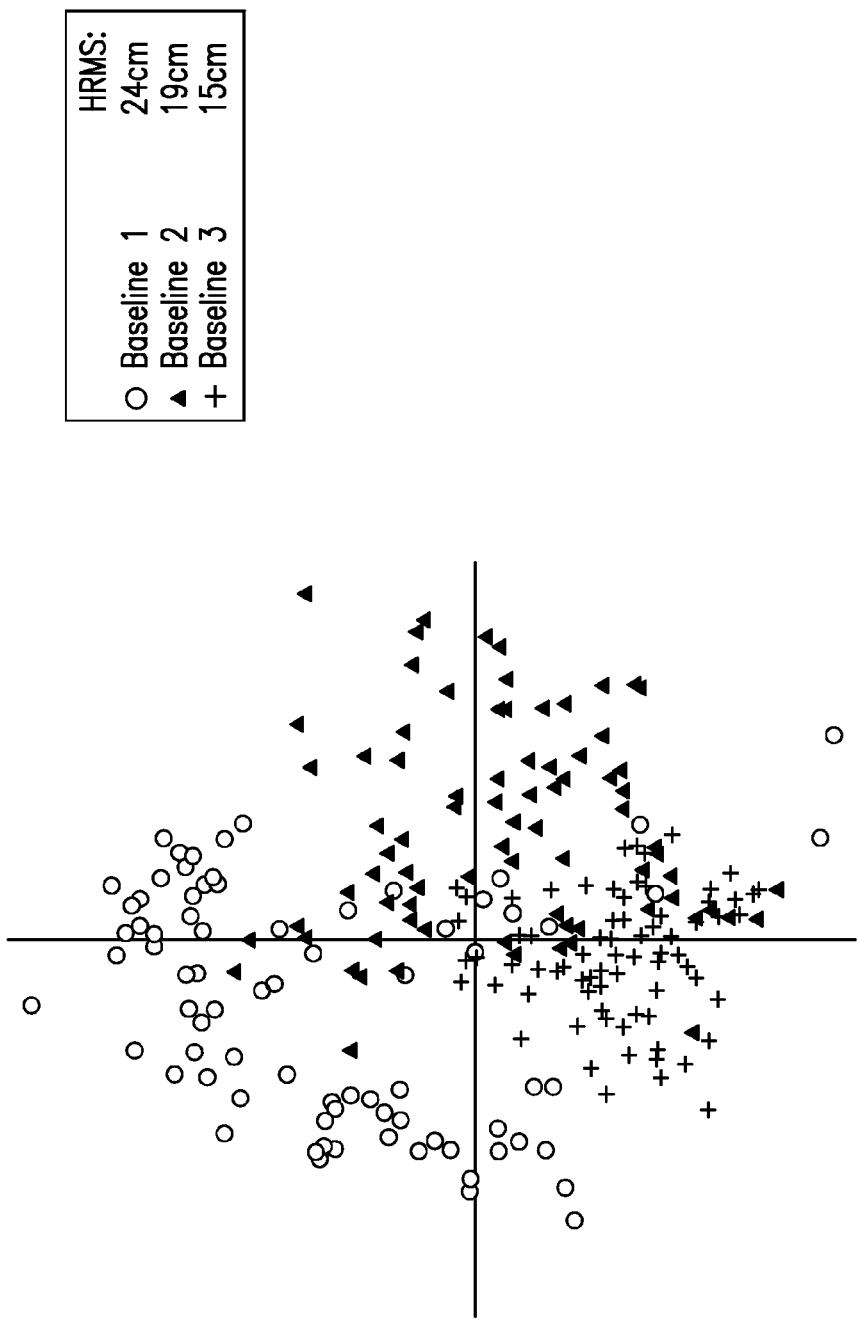
FIG. 14 shows the resulting positions from three different single baselines in accordance with some embodiments of the invention.
Figure 15:
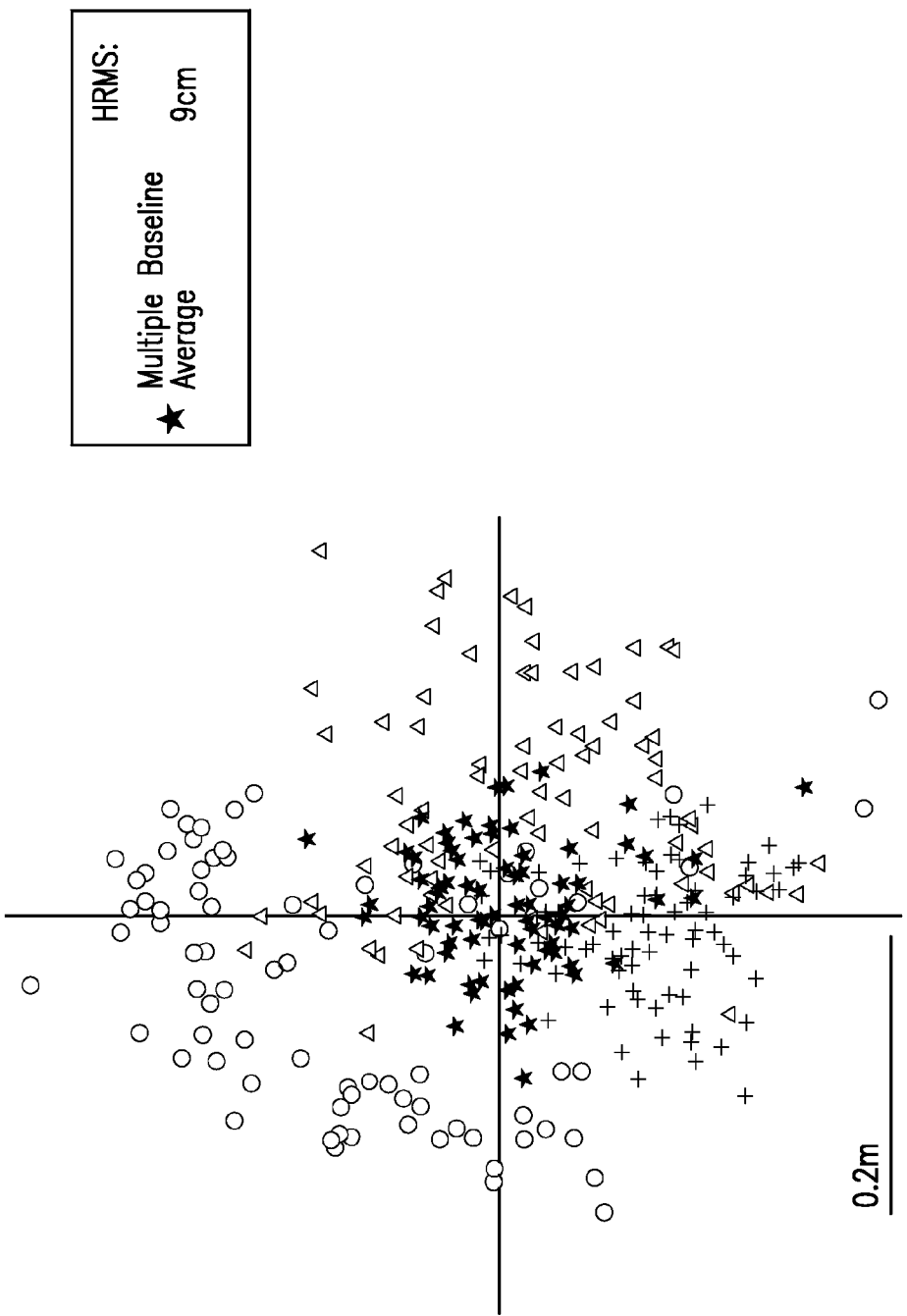
FIG. 15 shows the resulting positions after application of the MBA method in accordance with some embodiments of the invention.

FIG. 14 shows for example the determined positions in the horizontal plane, using three different single baselines. Application of the MBA method gives much more accurate positions, as shown in FIG. 15.

Figure 16:
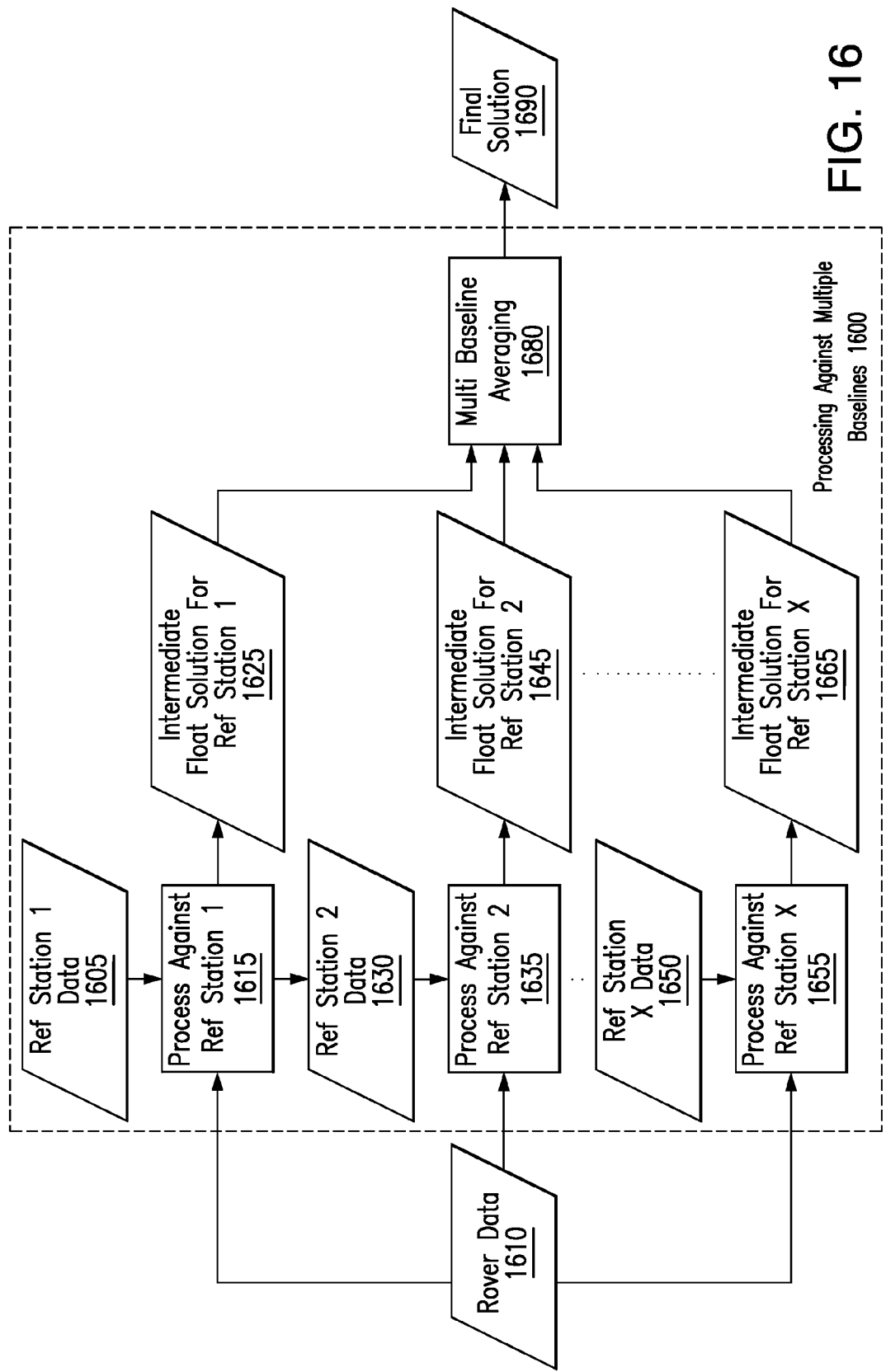
FIG. 16 is an overview of a multi-baseline adjustment process in accordance with some embodiments of the invention.

FIG. 16 is an overview of MBA 1600 in accordance with some embodiments of the invention. Data 1605 from a first reference station and rover data 1610 (L1 one and/or L1/L2) are supplied to a processor 1615 which produces an intermediate float solution 1625 for a first reference station (Ref Station 1). Data 1630 from a second reference station (Ref Station 2) and rover data 1610 (L1 one and/or L1/L2) are supplied to a processor 1635 which produces an intermediate float solution 1645 for reference station 2. Data 1650 from an X-th reference station and rover data 1610 (L1 one and/or L1/L2) are supplied to a processor 1655 which produces an intermediate float solution 1665 for reference station X. The intermediate float solutions 1625, 1645 and 1665 are then supplied to an MBA process 1680, to produce the averaged final float solution 1690.

Long Distance MBA Using Non-Iono-Free Observables.

Figure 17:
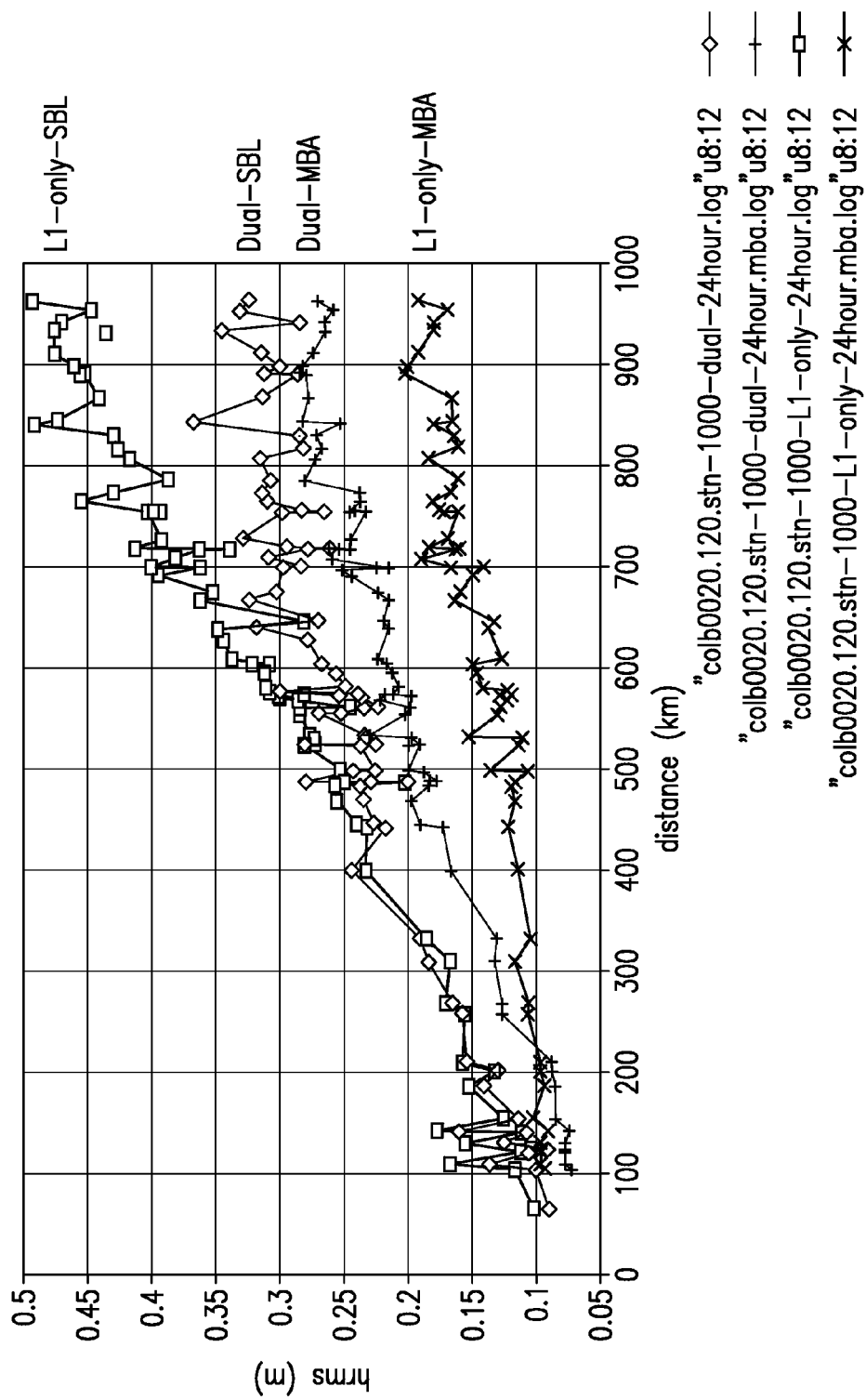
FIG. 17 shows the horizontal accuracy vs. distance for SBL and MBA, using the iono-free (LC) code combination in the dual-frequency case, in accordance with some embodiments of the invention.

FIG. 17 shows the horizontal accuracy (HRMS—horizontal root-mean-square) vs. baseline-length (distance between rover and reference station) for dual-frequency and L1-only data in single-baseline (SBL) and MBA mode.

In accordance with some embodiments of the invention, it was found, that for long baselines (>250 km), the L1-only MBA accuracy is much better as in the dual-frequency iono-free (LC) case. The reason for the higher accuracy in the L1-only MBA case is the usage of the less noisy observable combination (14), and the cancellation of the residual ionospheric error using the MBA method.

Figure 18:
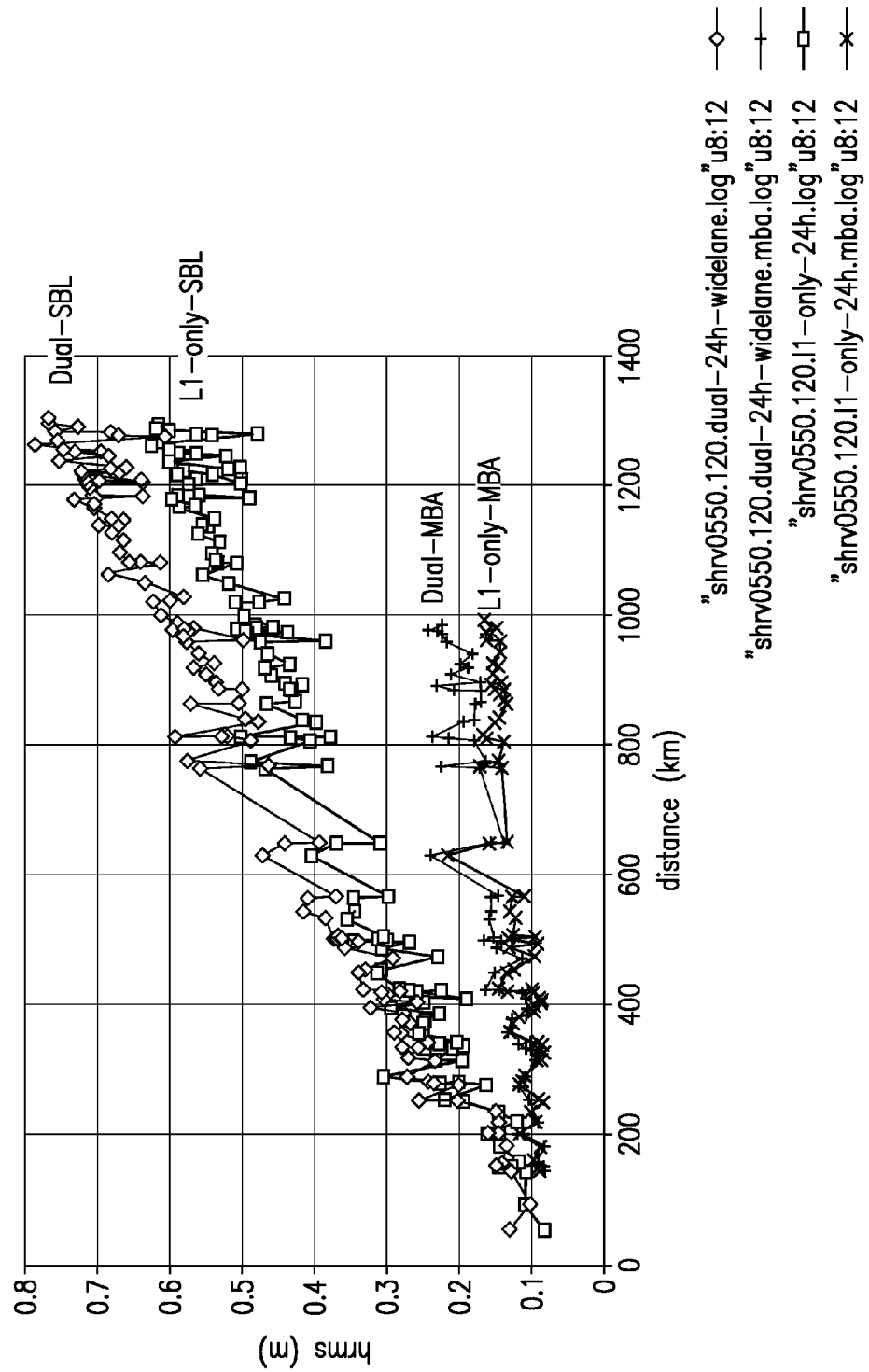
FIG. 18 shows the horizontal accuracy vs. distance for SBL and MBA, using the non iono-free (LW) code combination in the dual-frequency case, in accordance with some embodiments of the invention.

In accordance with some embodiments of the invention, the same high accuracy can be achieved also in the dual-frequency case, if a non-iono-free code/phase combination is used. As example, FIG. 18 shows the results using the less noisy non-iono-free wide-lane (LW) code combination $$\rho_{LW} = \frac{1}{\lambda_1 + \lambda_2}(\lambda_2 \rho_1 + \lambda_1 \rho_2) \quad (22)$$

for the dual-frequency case.

Furthermore, the L1-only observables [($\rho_1+\lambda_1\phi_1$)/2, $\lambda_1\phi_1$] and the L2-only observables [($\rho_2+\lambda_2\phi_2$)/2, $\lambda_2\phi_2$] can be processed separately. Afterwards, both position results can be combined.

Comparison with Prior art. LAPUCHA (1993) uses a multi-site technique only for DGPS (differential code positioning). But it does not address carrier-phase positioning with long baselines, and therefore it does not use the L1-carrier-phase ($\lambda_1\phi_1$) and the L1-code plus L1-carrier-phase ($\rho_1+\lambda_1\phi_1$)/2 combination.

The OmniSTAR-HP system (operated by the FUGRO CHANCE INC.) is using double-differential carrier-phase positioning, but it is using always the more noisy iono-free (LC) dual-frequency code- and phase combination (see LAPUCHA 2001, BISNATH 2003, and LAPUCHA 2004), more noisy than the L1-code plus L1-carrier-phase combination (14) or the wide-lane combination (22) that we use. But, because noise cannot be reduced with MBA, more noise leads to a larger position error and a longer convergence time.

Part 3

Stochastic Post-Processing Accuracy (SPPA) Predictor

When collecting GNSS data, it is often useful to know the accuracy of the determined position. Existing GPS receivers output an estimate of the accuracy of the position calculated at each epoch (the 'real-time accuracy estimate'). But many users perform post-processed differential correction to improve the accuracy of the GNSS positions. Therefore, the real-time accuracy estimate is not a good indication of the accuracy that will be achieved later. For example, the receiver may be calculating autonomous positions, or may be applying differential corrections to code solutions, whereas the post-processor may be calculating a more accurate carrier-phase solution.

Some embodiments of the invention solve this problem by supplying, at time of measurement, a prediction of the accuracy that will be achieved later after post-processing. This is very useful to the user to optimize productivity when a certain threshold of accuracy is required. It is very costly to re-visit a site if required accuracy is not achieved; likewise it is unproductive to collect GNSS measurements at a point for longer than necessary.

Stochastic post-processing accuracy (SPPA) prediction, in accordance with embodiments of the invention, is particularly useful when carrier float solutions are to be calculated during post-processing. Their accuracy increases with the amount of continuously collected measurements (in contrast to code solutions which have roughly similar accuracy regardless of tracking duration). For example, the SPPA indicator answers the question "How long do I have to stand here to get the 20 cm post-processed accuracy that my boss requires?".

In accordance with some embodiments of the invention, the SPPA is predicted during data collection using only the rover data. The reference data is not necessary for this purpose. Therefore, only the rover data, entered into the SPPA-Predictor in real-time, determines the resulting error estimate. The SPPA-Predictor is simply the RT-GNSS rover engine, but without the scaling of the "forward position ambiguity covariance matrix" using the ratio of the residual-variances and the a-priori variances. This means, that the SPPA-Predictor uses the internal error-propagation through the RT-GNSS rover engine with the given a-priori error models, to compute an error estimate. The internal structure of the RT-GNSS rover engine is described in PART 1 of this document and the Kalman filter is described in more detail in the U.S. patent application Ser. No. 10/696,528 (VOLLATH U., "Ambiguity Estimation of GNSS Signals for Three or more Carriers").

However not all information of the rover data is used. Important for the error estimate is only:
  Number of valid satellites in view (geometry of the constellation)
  Elevation mask
  SNR mask
  Expected baseline length
  Dual or single frequency mode
  Stop and go information (kinematic or static mode)
  Loss-of-lock/cycle-slip information
  Motion detection in static mode (same method as described in case of the RT-GNSS Rover-Engine).

The SPPA-Predictor examines the quality of carrier measurements and estimates how well the post-processed float solution will converge in time since carrier lock was obtained.

Figure 19:
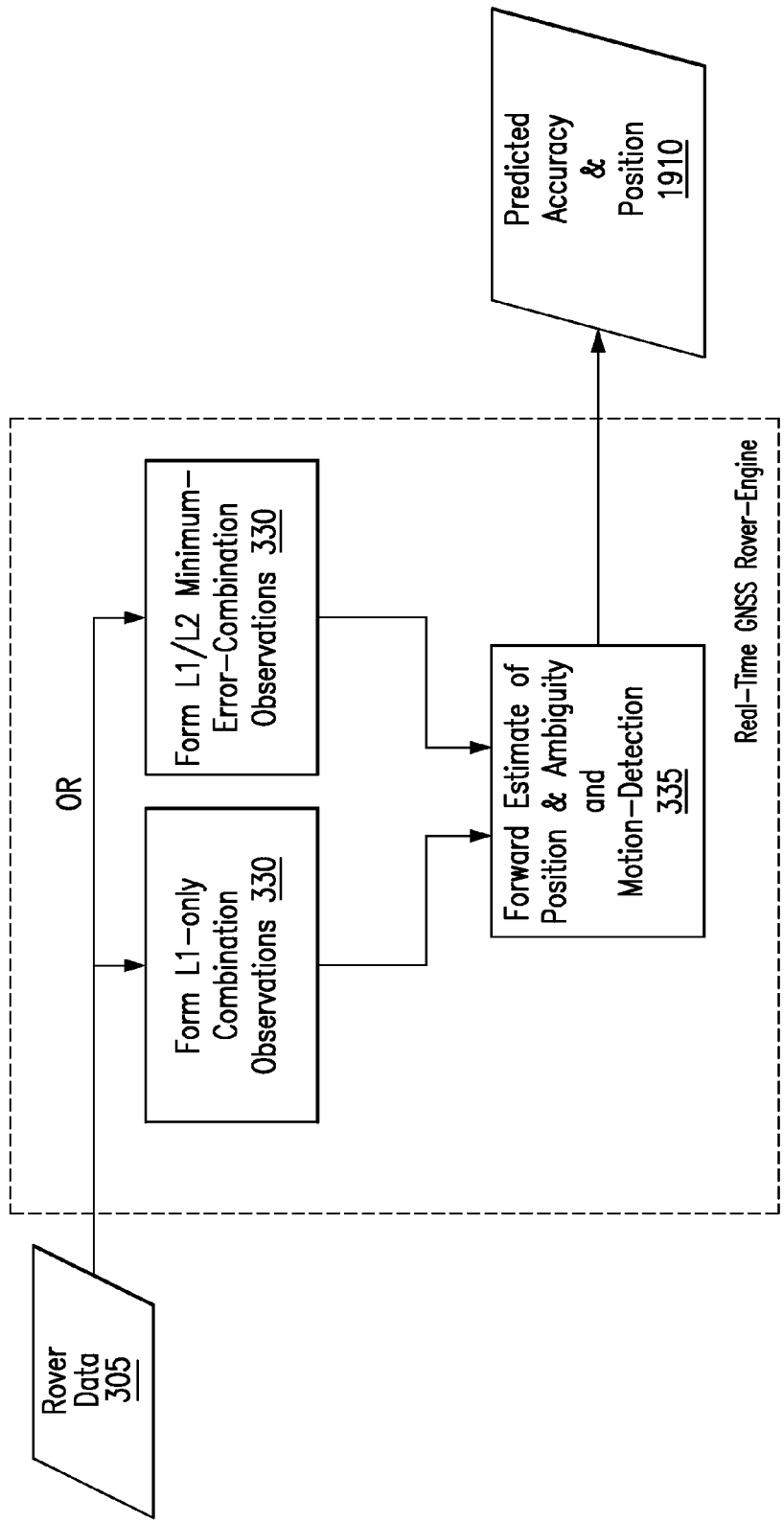
FIG. 19 is a flow chart of a stochastic post-processed accuracy predictor in accordance with some embodiments of the invention.

FIG. 19 is a flow chart of the SPPA-Predictor. Only the rover data 305 is provided to the RT-GNSS Rover-Engine. So, all processing steps for the handling of the reference data are not necessary (compare with FIG. 3). Hence, the un-differenced rover observable combinations 330 are used. Furthermore, the SPPA-Predictor computes the current single-point position (of the stand-alone rover), and therefore, the SPPA-Predictor is also capable to detect the motion of the rover 335, in particular during periods marked as static by the user. This prevents the user from wrong settings and results. As the result, the SPPA-Predictor outputs the predicted accuracy and position 1910.

The above method is primarily aimed at predicting post-processed float solutions, which increase in accuracy according to collection duration. But the concept can be generalized to work with other types of differential correction, such as code solutions.

The above method predicts the accuracy of a single baseline, i.e., using a single GNSS base station for differential correction. But accuracy can be improved by using data from multiple base stations in an averaging technique or an area network model (see MBA or VRS method above). Thus the accuracy prediction can be further improved by adding additional inputs about the post-processing that will be performed later, such as whether single or multiple baselines will be used, their number, their distance from the rover GNSS receiver, and their geometry around the rover GNSS receiver.

In addition to the display of the HRMS the remaining time to achieve the desired HRMS value can be displayed so that the user knows when enough data has been collected and/or another form of indication (e.g., an audible or visible signal) is given to indicate when enough data has been collected to achieve the desired HRMS value.

Figure 20:
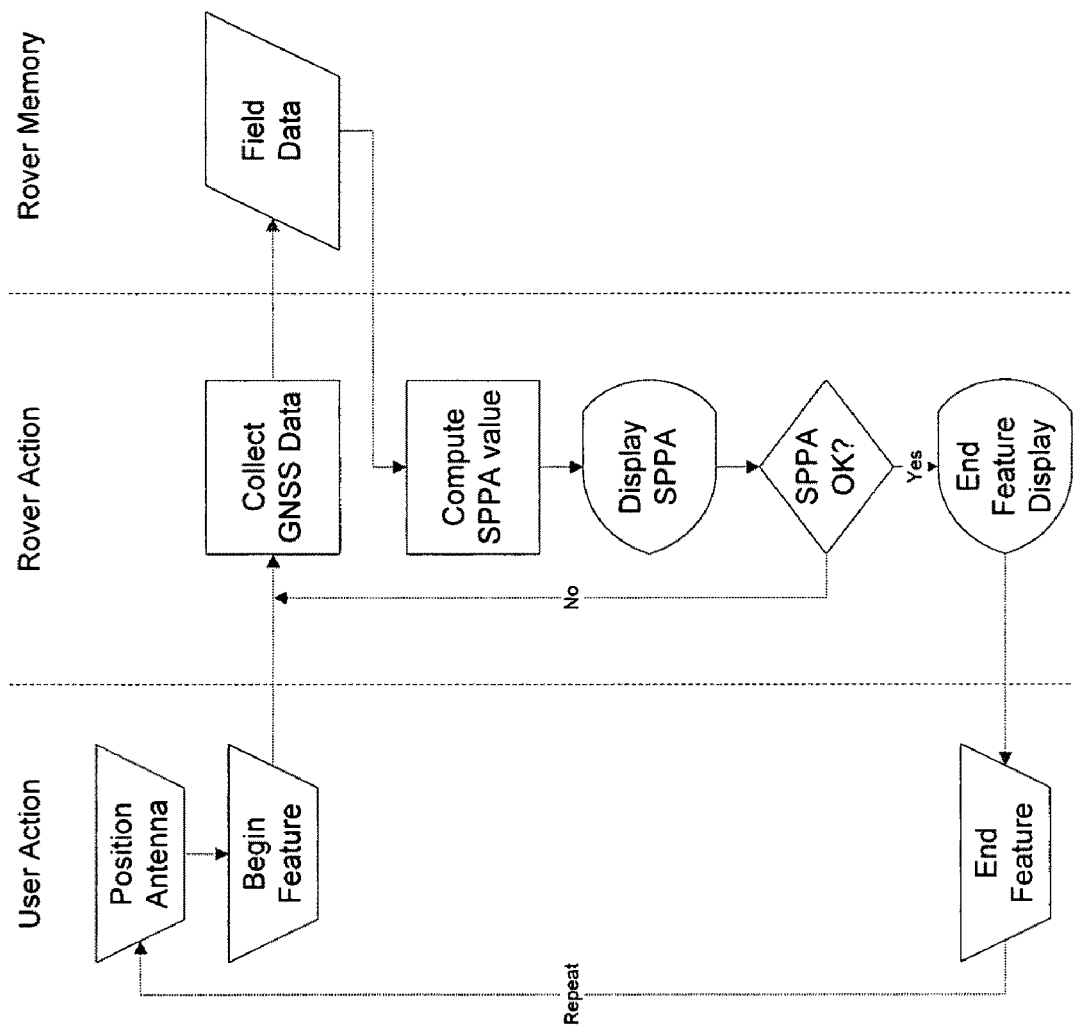
FIG. 20 is an operational view of GNSS data collection with a rover, using a stochastic post-processed accuracy predictor for the determination of the occupation time of a point-feature, in accordance with some embodiments of the invention.

FIG. 20 shows an operational view of GNSS data collection with a rover in accordance with some embodiments of the invention. At 2005 a user positions the rover antenna at a feature and at 2010 initiates data collection at the feature. The rover collects GNSS data at 2015 and stores it to memory at 2020. The collected GNSS data is used to compute the SPPA at 2025, and the SPPA value (and/or time remaining to a desired SPPA value) is displayed at 2030. GNSS data collection continues until a check of the SPPA value at 2035 meets requirements. When the SPPA value meets requirements, the user is so informed at 2040 by an end-feature display or other indication. The user terminates operation at the feature at 2045 and repositions the antenna at another feature at 2005.

Those of ordinary skill in the art will realize that the detailed description of embodiments of the present invention is illustrative only and is not intended to be in any way limiting. Other embodiments of the present invention will readily suggest themselves to such skilled persons having the benefit of this disclosure. For example, while a minimum-error combination is employed in the examples, those of skill in the art will recognized that many combinations are possible and that a combination other than a minimum-error combination can produce acceptable if less than optimum results; thus the claims are not intended to be limited to minimum-error combinations other than where expressly called for. Reference is made in detail to implementations of the present invention as illustrated in the accompanying drawings. The same reference indicators are used throughout the drawings and the following detailed description to refer to the same or like parts.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented on a data processing computer such as a personal computer, workstation computer, mainframe computer, or high-performance server running an OS such as Microsoft® Windows® XP and Windows® 2000, available from Microsoft Corporation of Redmond, Wash., or Solaris® available from Sun Microsystems, Inc. of Santa Clara, Calif., or various versions of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Kalman Filter Tutorial

A Kalman filter employs equations to estimate the state of a process in a way that minimizes the mean of the squared error. An introduction to Kalman filters is given in G. Welch et al., *An Introduction to the Kalman Filter*, UNC-Chapel Hill, TR 95-041, Jul. 24, 2006. As described there (using somewhat different notation), a Kalman filter addresses the general problem of trying to estimate the state $x \in \Re^n$ of a discrete-time controlled process that is governed by the linear stochastic difference equation:

$$x_k = Ax_{k-1} + w_{k-1} \qquad (23.1)$$

with a measurement $z \in \Re^m$ that is $$z_k = Hx_k + v_k. \qquad (23.2)$$

In the Welch et al. notation, the random variables $w_k$ and $v_k$ represent the process and measurement noise, respectively. They are assumed to be independent of each other, white, and with normal probability distributions $$p(w) \sim N(0, Q), \qquad (23.3)$$

$$p(v) \sim N(0, R) \qquad (23.4)$$

where Q is the process noise covariance matrix and R is the measurement noise covariance matrix in the Welch et al. notation.

The n×n matrix A in the difference equation (23.1) relates the state at the previous time step k−1 to the state at the current step k, in the absence of either a driving function or process noise. The m×n matrix H in the measurement equation (23.2) relates the state to the measurement $z_k$.

The a priori state estimate at time step k given knowledge of the process prior to step k is defined as $\hat{x}_k^- \in \Re^n$ (note superscript "minus"), and the a posteriori state estimate at time step k given measurement $z_k$ is defined as $\hat{x}_k \in \Re^n$. The a priori and a posteriori state estimate errors are then defined as $$e_k^- \equiv x_k - \hat{x}_k^-, \text{ and}$$

$$e_k \equiv x_k - \hat{x}_k.$$

The a priori estimate error covariance is then $$P_k^- = E[e_k^- e_k^{-T}] \qquad (23.5)$$

and the a posteriori estimate error covariance is $$P_k = E[e_k e_k^T] \qquad (23.6)$$

The goal of the Kalman filter equations is to compute an a posteriori state estimate $\hat{x}_k$ as a linear combination of an a priori states estimate $\hat{x}_k^-$ and a weighted difference between an actual measurement $z_k$ and a measurement prediction $H\hat{x}_k^-$:

$$\hat{x}_k = \hat{x}_k^- + K(z_k - H\hat{x}_k^-) \qquad (23.7)$$

The difference $(z_k - H\hat{x}_k^-)$ is called the measurement innovation, or the residual. The residual reflects the discrepancy between the predicted measurement $H\hat{x}_k^-$ and the actual measurement $z_k$. A residual of zero means the two are in agreement.

The n×m matrix K is chosen to be the gain or blending factor that minimized the a posteriori error covariance $P_k$. This minimization can be accomplished by substituting (23.7) into the definition for $e_k$, substituting that into equation (23.6), performing the indicated expectations, taking the derivative of the trace of the result with respect to K, setting that result equal to zero, and then solving for K. One form of the resulting K that minimizes (23.6) is given by $$K_k = \frac{P_k^- H^T}{H P_k^- H^T + R}. \qquad (23.8)$$

As the measurement error covariance R approaches zero, the gain K weights the residual more heavily:

$$\lim_{R_k \to 0} K_k = H^{-1}.$$

As the a priori estimate error covariance $P_k^-$ approaches zero, the gain K weights the residual less heavily:

$$\lim_{P_k^- \to 0} K_k = 0.$$

Thus as the measurement error covariance R approaches zero, the actual measurement $z_k$ is trusted more, while the predicted measurement $H\hat{x}_k^-$ is trusted less. As the a priori estimate error covariance $P_k^-$ approaches zero the actual measurement is trusted less, while the predicted measurement $H\hat{x}_k^-$ is trusted more.

The Kalman filter estimates a process by using a form of feedback control: the filter estimates the process state at some time and then obtains feedback in the form of noisy measurements. The equations for the Kalman filter fall into two groups: time update equations and measurement update equations. The time update equations project forward in time the current state and error covariance estimates to obtain the a priori estimates for the next time step. The measurement update equations provide for the feedback, incorporating a new measurement into the a priori estimate to obtain an improved a posteriori estimate.

The time update equations can also be thought of as predictor equations, while the measurement update equations can be thought of as corrector equations. The time update projects the current state estimate ahead in time. The measurement update adjusts the projected estimate by an actual measurement at that time.

The discrete Kalman filter time update equations are, in Welch et al. notation:

$$\hat{x}_k^- = A\hat{x}_{k-1} \tag{23.9}$$

$$P_k^- = AP_{k-1}A^T + Q \tag{23.10}$$

These equations project the state and covariance estimates forward from time step k−1 to time step k. A is from (23.1), while Q is from (23.3).

The discrete Kalman filter measurement update equations are, in Welch et al. notation:

$$K_k = P_k^- H^T (HP_k^- H_T + R)^{-1} \tag{23.11}$$

$$\hat{x}_k = \hat{x}_k^- + K_k(z_k - H\hat{x}_k^-) \tag{23.12}$$

$$P_k = (I - K_k H) P_k^- \tag{23.13}$$

The first task during the measurement update is to compute the Kalman gain, $K_k$. The next step is to measure the process to obtain $z_k$, and then to generate an a posteriori state estimate by incorporating the measurement as in (23.12). Then an a posteriori error covariance estimate is obtained as in (23.13).

After each time and measurement update pair, the process is repeated with the previous a posteriori estimates used to project or predict the new a priori estimates. The Kalman filter thus recursively conditions the current estimate on all of the past measurements.

A case study on the use of Kalman filters in processing of GPS observations is found at Chapter 10 of R. BROWN et al., INTRODUCTION TO RANDOM SIGNALS AND APPLIED KALMAN FILTERING, Second Edition, John Wiley & Sons, 1992.

Figure 21A:
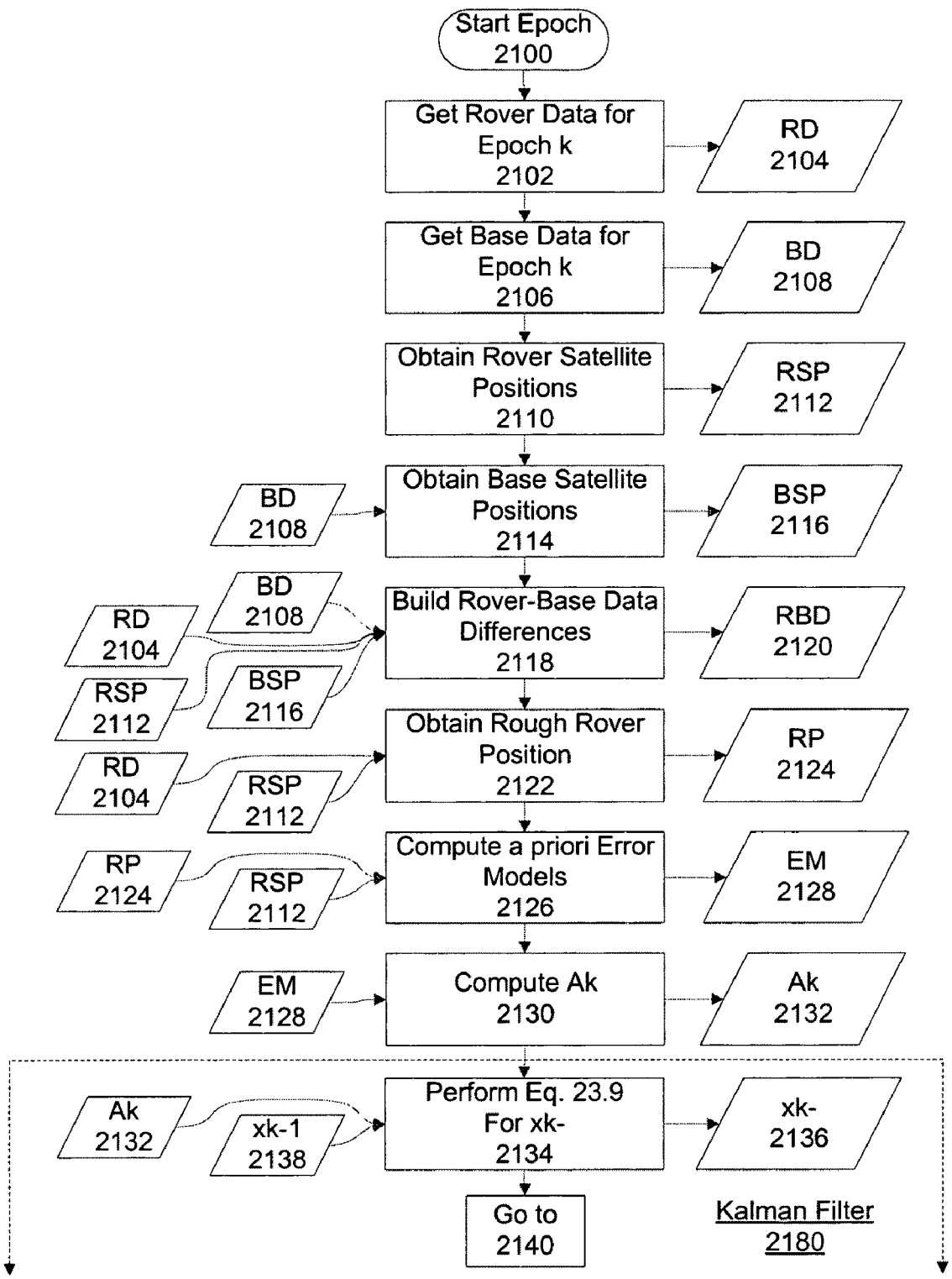
FIG. 21A and FIG. 21B show a flow chart of typical prior-art GNSS signal processing.
Figure 21B:
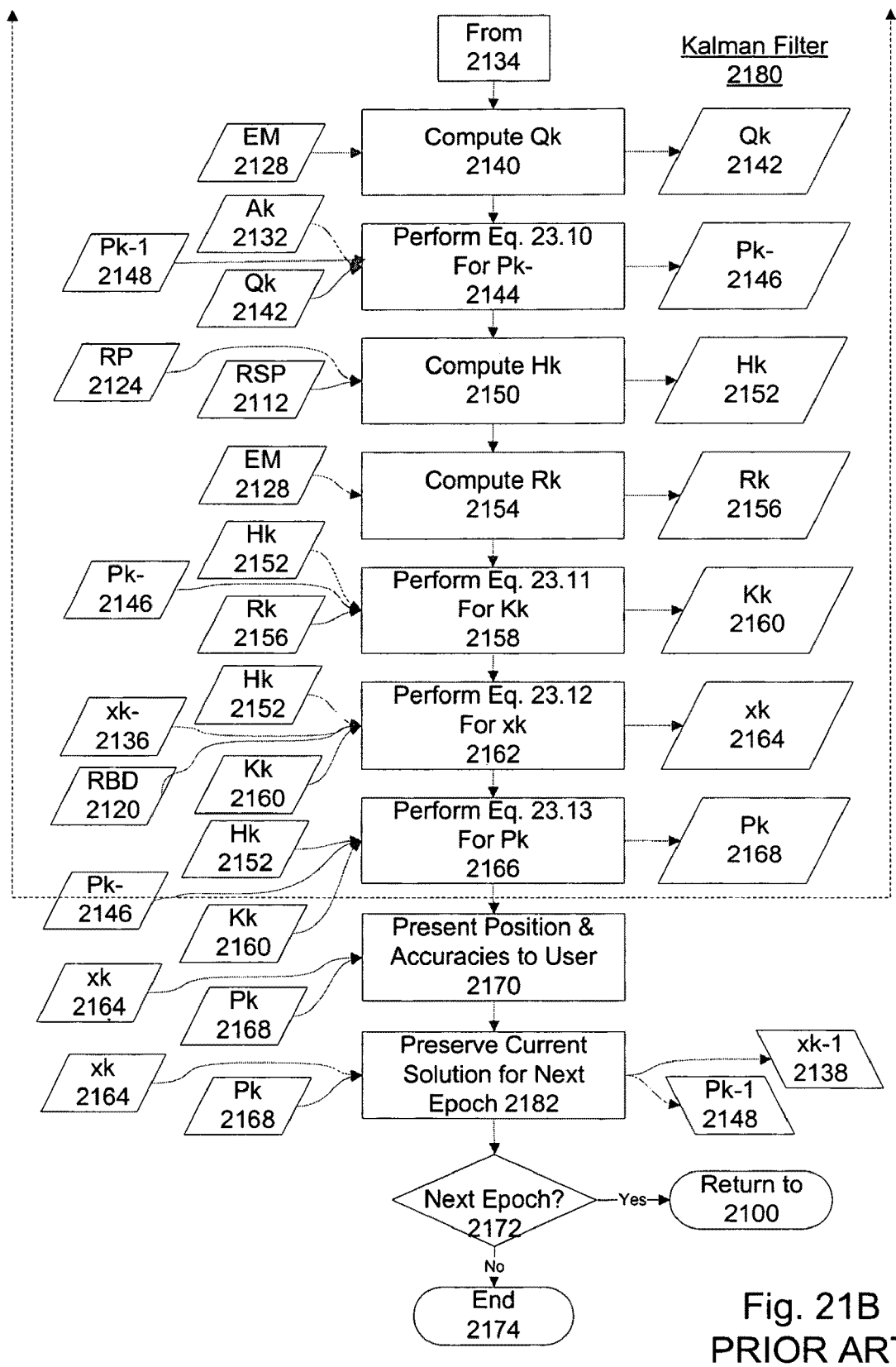

FIGS. 21A and 21B show a flow chart of typical prior-art GNSS signal processing, applying time-update equations 23.9 and 23.10 and measurement update equations 23.11, 23.12 and 23.13. The overall process begins at 2100. The Kalman filter portion 2180 of the process is outlined in dashed lines. Step 2102 obtains rover data 2104 for a current epoch k, representing measurements of GNSS satellite signals received by the rover in that epoch. Step 2106 obtains base data 2108 for current epoch k, representing measurements of GNSS satellite signals for a reference-station location for the epoch. The base data can be from a single base station or can be virtual reference station data synthesized for a reference station location from observations of multiple network reference stations. Step 2110 obtains rover satellite positions 2112. These are the positions at epoch k of the satellites tracked by the rover. Step 2114 obtains base satellite positions 2116. These are the positions at epoch k of the satellites for which base data is available, e.g., of the satellites in view at the reference station location. Satellite positions can be determined from the satellite navigation message or from an alternate data source such as the Omnistar service or an SBAS augmentation system such as WAAS.

Step 2118 builds rover-base data differences 2120 for current epoch k, which may be single or double differences, from the current-epoch rover data 2104, the current-epoch base data 2108, the current-epoch rover satellite positions 2112 and the current-epoch base satellite positions 2116. Step 2122 obtains a rough rover position 2124 for current epoch k. Rough rover position 2124 is typically available from the receiver's firmware but, if not, is readily calculated as a single-point position solution from the current-epoch rover data 2104 and the current-epoch rover satellite positions 2112. Step 2126 computes a priori error models 2128 for epoch k from the current-epoch rough rover position 2124 and the current-epoch rover satellite positions 2112. The a priori error models are typically based on satellite elevations viewed from the rover and/or carrier signal-to-noise ratio information from the rover receiver's signal tracking loops.

Step 2130 computes the time update matrix $A_k$ 2132 for the current epoch k from the error models 2128. Step 2134 applies Equation 23.9 to determine an a priori estimate 2136 of state vector $\hat{x}_k^-$ from time-update matrix $A_k$ 2132 and the a posteriori state vector $\hat{x}_{k-1}$ 2138 of prior epoch k−1. Techniques for appropriate initialization of the filter values for the first epoch are described in the literature and in US 2005/0101248 A1, for example. Step 2140 computes a process noise matrix $Q_k$ 2142 for the current epoch from the error models 2128. Step 2144 applies Equation 23.10 to determine an a priori error covariance estimate $P_k^-$ 2146 for the current epoch from current-epoch time-update matrix $A_k$ 2132 and the a posteriori error covariance estimate $P_{k-1}$ 2148 of prior epoch k−1 and the current-epoch process noise matrix $Q_k$ 2142. Step 2150 computes the design matrix $H_k$ 2152 for current epoch k from the current-epoch rough rover position 2124 and the current-epoch rover satellite positions 2112. Step 2154 computes the measurement noise matrix $R_k$ for current epoch k from the error models 2128.

Step 2158 applies Equation 23.11 to compute a current-epoch Kalman filter gain value $K_k$ 2160 from the current-epoch design matrix $H_k$ 2152, the current-epoch a priori error covariance estimate $P_k^-$ 2146, and the current-epoch measurement noise matrix $R_k$. Step 2162 applies Equation 23.12 to compute an a posteriori state vector estimate $X_k$ 2164 for the current epoch k from the current-epoch design matrix $H_k$ 2152, the current-epoch Kalman filter gain value $K_k$ 2160, the current-epoch a priori estimate 2136 of state vector $\hat{x}_k^-$, and the rover-base data differences 2120. Step 2166 applies Equation 23.13 to compute an a posteriori error covariance estimate $P_k$ 2168 for current epoch k. Rover position from a posteriori state vector estimate $x_k$ 2164 and rover position accuracy from a posteriori error covariance estimate $P_k$ 2168 are typically presented to or otherwise made available to the user. The a posteriori error covariance estimate $P_k$ 2168 contains variance and covariance data for each value of a posteriori state vector estimate $x_k$ 2164, though the values of interest are the 3×3 submatrix containing the variance and covariance for the x, y and z rover position values. These are typically given to the user in a converted form as North, East and Height error, or as vertical and horizontal error. Step 2182 preserves the current-epoch values of a posteriori state vector estimate $x_k$ 2164 and a posteriori error covariance estimate $P_k$ 2168 for use in the succeeding epoch as the a posteriori state vector $\hat{x}_{k-1}$ 2138 and the a posteriori error covariance estimate $P_{k-1}$ 2148. Step 2172 determines whether another epoch of data is ready for processing. If yes, the flow returns to step 2100. If not, the process ends at 2174.

Stochastic Post-Processed Accuracy (SPPA) Indicator Concepts

The complete processing of accurate positions requires data from the user receiver (rover) as well as from the reference receiver used at the same time. In the example of FIG. 21A and FIG. 21B, the reference data is available in real time. If reference data is not available during collection of data at the rover, accurate rover positions can be determined later by post-processing the collected rover data with reference data from corresponding epochs. It would be useful to know how much rover data must be collected to obtain a post-processed rover position of a desired accuracy, e.g., to improve the efficiency of data collection.

This section describes how an estimate of the achieved post-processed accuracy can be computed from the rover data only, without access to the reference data to be used in post-processing. This is useful for downloading the reference data later and post-processing the positions. A purpose of the accuracy indicator is to show the user in the field when he has collected sufficient data in the field for later post processing. He can continue work by collecting data a next measurement location or finish collecting data as soon as the required accuracy is reached. In prior-art systems, a very conservative estimate of the amount of data needed is provided to the user to be on the safe side. This negatively affects the productivity of the user as he has to occupy a point longer than necessary.

The prior-art example of position estimation in FIG. 21A and FIG. 21B is a filter (usually a Kalman filter) that is simultaneously estimating positions and associated accuracy estimates.

A filter (such as a Kalman filter) is also used for embodiments of the SPPA application of the present invention. It is not important if that filter is formulated as a "big filter" as described in the literature (a single filter which estimates all states in a single vector), a factorized filter structure as described in US 2005/0101248 A1, or a combination of those with state augmentation or "whitening of noise" to model correlated errors. The whole method also works for least-squares formulations of the position computation.

To compute position, rover data and reference data are needed for coinciding points in time (epochs). They are used to build single (or double) differences, thus processing the data in differential mode to eliminate or at last mitigate atmospheric and orbit/satellite clock errors in the rover data.

SPPA Rover-Only Operation

If reference data is not available for any reason, a large part of the position estimation process can still be performed. A look at the Kalman filter equations (23.9 through 23.13) shows that equations 23.10, 23.11 and 23.13 can be executed without having any single-difference data as designated by the $z_k$ term. Equation 23.10 uses the current-epoch time-update matrix $A_k$, the previous epoch's a posteriori error covariance matrix $P_{k-1}$ and the current-epoch process noise matrix $Q_k$ to compute the current epoch's a priori error covariance matrix $P_k^-$. Equation 23.11 uses the current epoch's a priori error covariance matrix $P_k^-$, current-epoch design matrix $H_k$ and the current-epoch measurement noise matrix $R_k$ to compute the current-epoch filter gain $K_k$. Equation 23.13 uses the current-epoch filter gain $K_k$ and the current-epoch a priori error covariance matrix $P_k^-$ to compute the current epoch's a posteriori error covariance matrix $P_k$.

The current-epoch time-update matrix $A_k$, the current-epoch process noise matrix $Q_k$, the current-epoch design matrix $H_k$ and the current-epoch measurement noise matrix $R_k$ can all be computed from the rover data of only the current epoch, without need for reference data. Thus, the current epoch's a posteriori error covariance matrix $P_k$ is completely determined from the rover data, without need for reference data. Of particular importance is that the information about position accuracy desired for SPPA (the position accuracy expected upon subsequent differential post-processing of the rover data with reference data of corresponding epochs) is included in the current epoch's a posteriori error covariance matrix $P_k$.

The needed elements of the filter operation are derived from rover information as follows.

The current-epoch time-update matrix $A_k$ mainly consists of diagonal entries of 1 for filter states that don't change over time and entries that refer to the correlated noise modeled. The latter is completely taken from the a priori error models that will be addressed below.

The process noise matrix $Q_k$ contains either zeroes for filter states that don't change and entries that refer to the correlated noise taken from the a priori error models, or high variance entries corresponding to carrier phase cycle slips to reset the ambiguity state estimates and variances after a cycle slip.

The measurement noise matrix $R_k$ is completely determined from the a priori error models.

Each row of the design matrix $H_k$ refers to a single satellite measurement. The columns define to what the measurement refers for each estimated state (partial derivatives). The partial of the observation $l_k^s$ (where s designates which satellite) with respect to the x-component of the rover position is given by $$\frac{\partial l_k^s}{\partial x} = \frac{x - x_k^s}{\sqrt{(x - x_k^s)^2 + (y - y_k^s)^2 + (z - z_k^s)^2}}. \tag{24}$$

Similarly for the y- and z-components:

$$\frac{\partial l_k^s}{\partial y} = \frac{y - y_k^s}{\sqrt{(x - x_k^s)^2 + (y - y_k^s)^2 + (z - z_k^s)^2}} \text{ and} \tag{25}$$

$$\frac{\partial l_k^s}{\partial z} = \frac{z - z_k^s}{\sqrt{(x - x_k^s)^2 + (y - y_k^s)^2 + (z - z_k^s)^2}} \tag{26}$$

where x, y, and z are the components of the rough rover position and $x_k^s$, $y_k^s$ and $z_k^s$ are the components of the satellite position.

Three entries of each line of design matrix $H_k$ refer to the partials of the measurement with respect to the rover position. They are computed from the satellite position for that measurement time (epoch) of data and the rover position. Satellite position can be determined from the satellite navigation message or from other sources such as Omnistar, WAAS/SBAS, IGS, or an almanac. It is sufficient to have a very rough position estimate for the satellites and for the rover to get the required post-processed accuracy prediction. A rough rover position and rough satellite positions with error of about 100 m or even about 1 km or more are believed adequate for purposes of the SPPA predictor. A rough rover position can be obtained as a standard navigation position (also called single-point position) which is provided by the receiver firmware or can be easily computed using known methods based on the rover pseudorange data alone. See for example the standard GPS position solution equations at Section 10.1 of R. BROWN et al., INTRODUCTION TO RANDOM SIGNALS AND APPLIED KALMAN FILTERING, Second Edition, John Wiley & Sons, 1992.

The other entries of each line of design matrix $H_k$ refer to ambiguities or modeled error like multipath and ionosphere and remain are constant from epoch to epoch.

Thus, the only information needed to compute the required filter input can be derived from the satellite positions (computed from rover-only pseudoranges and broadcast ephemeris information) and a rough rover position. Satellite positions can be determine from other information if available, such as Omnistar corrections or SBAS corrections from WAAS. To know which measurements are actually available and where the rover carrier phase data contains cycle slips, the rover-only measurements are used, too. No reference data is used for the process.

A Priori Error Models

Some embodiments of the invention use a priori knowledge of the error characteristics of the measurements. The variance of the uncorrelated error component (noise) is employed together with the correlated error variance and its correlation time constant. See U. VOLLATH et al., Network RTK Versus Single Base RTK—Understanding the Error Characteristics, PROCEEDINGS OF THE GNSS-2002 CONFERENCE, May 2002, pp. 2774-2780.

This is implemented by the analysis of representative data sets. The errors are typically dependent on the elevation of the individual satellites and/or the carrier-to-noise ratio computed by the receiver tracking loops. Many methods are available in the literature. One method is the elevation mapping function approach deriving the variance $\sigma_\alpha^2$ at elevation a from the variance $\sigma_{90°}^2$ at elevation 90°.

The a priori error models used are typically computed from the elevation angle of the respective satellite used for each measurement. This is described in equation (27). The elevation angle of the satellite is easily computed from satellite positions and rough rover position:

$$elev = \text{ArcSin}\sqrt{\frac{x^2 + y^2 + z^2\left(\frac{A}{B}\right)^4}{(x-x_k^s)^2 + (y-y_k^s)^2 + (z-z_k^s)^2}} \quad (27)$$

where x, y, and z are the components of the rough rover position and $x_k^s$, $y_k^s$ and $z_k^s$ are the components of the satellite position. A is the semi-major axis of the ellipsoid modeling the earth shape and B is the semi-minor axis. Useful elevations for weighting can also be obtained by assuming A/B=1.

Alternatively or in addition to this approach, error models can be derived from the carrier-to-noise ratio (CNr/SNr) provided for the rover measurements. This is also rover-only information. See, for example, F. BRUNNER et al., *GPS signal diffraction modelling. The stochastic SIGMA-D model*, J. GEOD., 73, 259-267, 1999; and H. HARTINGER et al., *Variances of GPS phase observations. The SIGMA-ε model*, GPS SOLUTIONS, 2/4, 35-43, 1999. Typically, the reference station SNr values are not available at the rover and the errors in the differential data is dominated by the rover contributions.

Alternatively or in addition to the foregoing approaches, other error models known in the art can be used. These may include, for example, models based on atmospheric information (ionospheric and/or tropospheric models). Atmospheric information can be obtained, for example from external sources via mobile phone or other communications link.

The Kalman filter may be implemented using the Bierman UD-Filter (see G. Bierman, *Factorization Methods for Discrete Sequential Estimation*, Academic Press, 1977) or any other numerically-stabilized implementation of the Kalman filter algorithm.

In embodiments of the invention, modeling of the correlated errors in the minimum-error carrier-phase combination is done by the state augmentation technique or by the whitening-of-noise technique. In case of uncorrelated errors that are very small compared to the correlated errors, a simpler filter can be applied in accordance with embodiments of the invention. See the "whitening of noise" approach in G. BIERMAN, *Factorization Methods for Discrete Sequential Estimation*, Academic Press, 1977, and the "differencing approach" in A. GELB, (ed.), *Applied Optimal Estimation*, The M.I.T. Press, 1977, pp. 133-136.

Figure 22A:
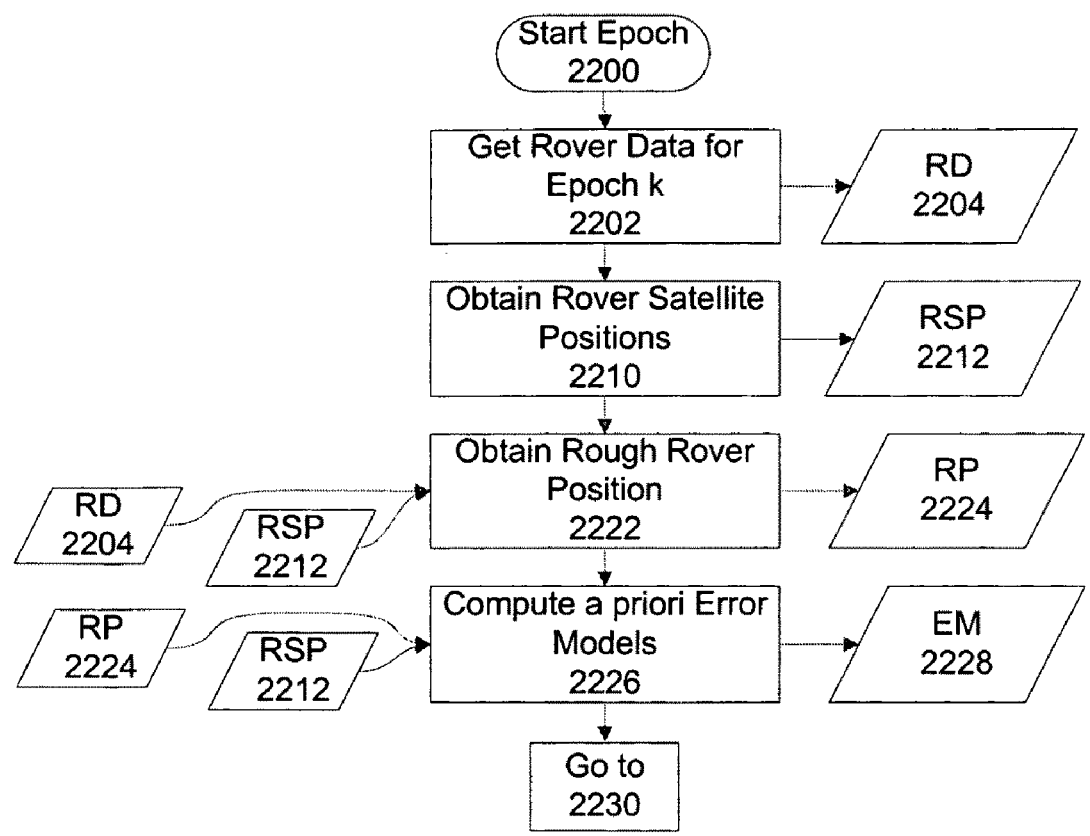
FIG. 22A and FIG. 22B show an embodiment of a filter process in accordance with some embodiments of the invention.
Figure 22B:
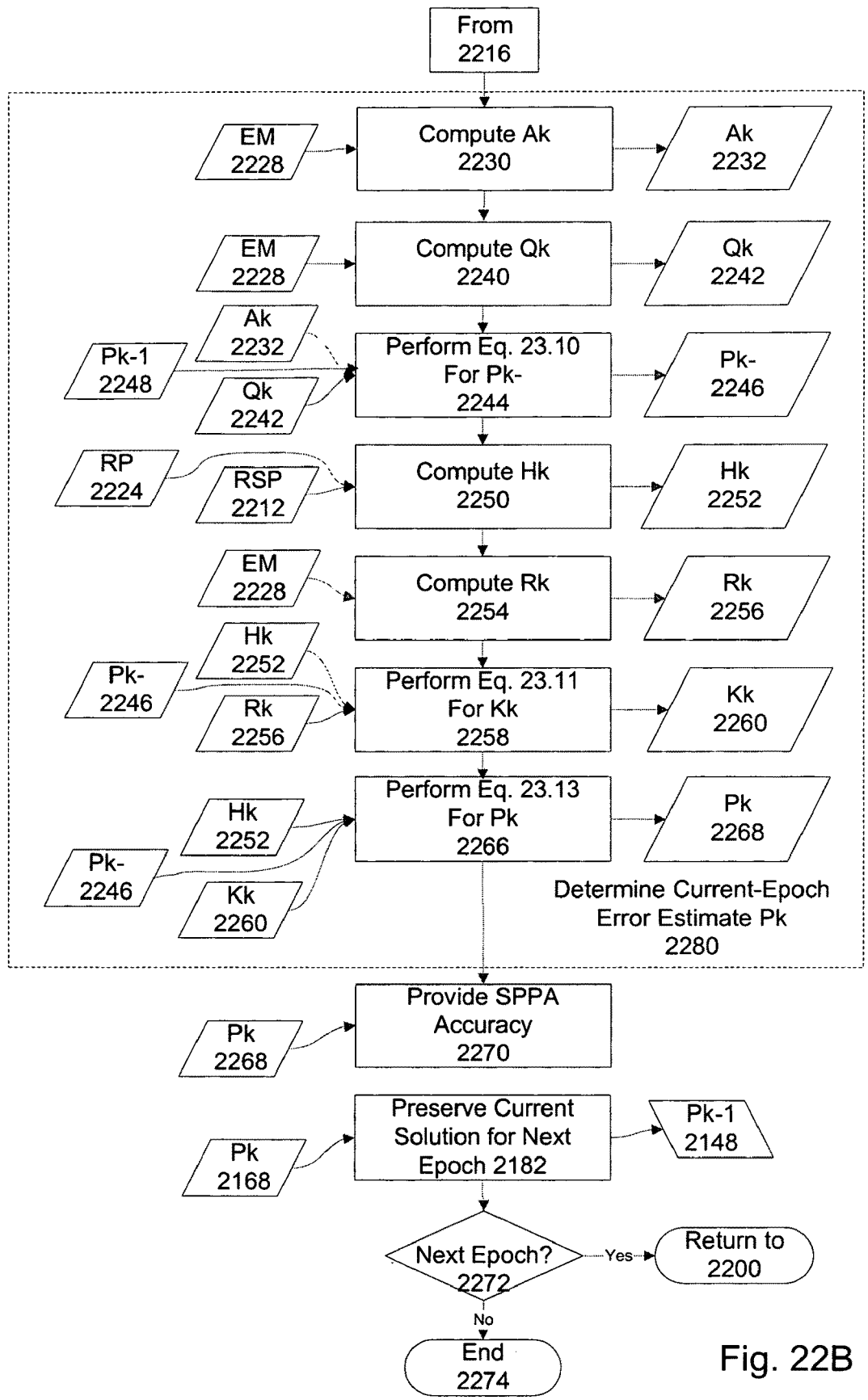

FIG. 22A and FIG. 22B show an embodiment of a filter process for SPPA which can be carried out by a filter such as Kalman filter 905. Referring to FIG. 22A and FIG. 22B, the process for a current epoch begins at 2200. Step 2202 obtains rover data 2204 for a current epoch k, representing measurements of GNSS satellite signals received by the rover in that epoch. Step 2210 obtains rover satellite positions 2212. These are the positions at epoch k of the satellites tracked by the rover. Satellite positions can be determined from the satellite navigation message or from an alternate data source such as the Omnistar service or an SBAS augmentation system such as WAAS.

Step 2222 obtains a rough rover position 2224 for current epoch k. Rough rover position 2224 is typically available from the receiver's firmware but, if not, is readily calculated as a single-point position solution from the current-epoch rover data 2204 and the current-epoch rover satellite positions 2212. Alternatively, the rough rover position 2224 may be obtained from any other desired source such as an inertial navigation system, user input, a memory containing rough positions at which data is to be collected, or a GNSS-equipped mobile phone. Where the user is normally collecting data with reference data available (as in FIG. 21A and FIG. 21B) but loses access to the reference data (e.g., due to a communications link failure), the last rover position is known and can be used in the SPPA predictor of FIG. 22A and FIG. 22B to allow continued collection of data without loss of user productivity, since the user will know from the predicted post-processing accuracy how much observation data to collect at each rover position.

Step 2226 computes a priori error models 2128 for epoch k from the current-epoch rough rover position 2124 and the current-epoch rover satellite positions 2112. The a priori error models are typically based on satellite elevations viewed from the rover and/or carrier signal-to-noise ratio information from the rover receiver's signal tracking loops.

Step 2230 computes the time update matrix $A_k$ 2232 for the current epoch k from the error models 2228. Step 2240 computes a process noise matrix $Q_k$ 2242 for the current epoch from the error models 2228. Step 2244 applies Equation 23.10 to determine an a priori error covariance estimate $P_k^-$ 2246 for the current epoch from current-epoch time-update matrix $A_k$ 2232 and the a posteriori error covariance estimate $P_{k-1}$ 2248 of prior epoch k−1 and the current-epoch process noise matrix $Q_k$ 2242. Techniques for appropriate initialization of the filter values for the first epoch are described in the literature and in US 2005/0101248 A1, for example. Step 2250 computes the design matrix $H_k$ 2252 for current epoch k from the current-epoch rough rover position 2224 and the current-epoch rover satellite positions 2212. Step 2254 computes the measurement noise matrix $R_k$ for current epoch k from the error models 2228.

Step 2258 applies Equation 23.11 to compute a current-epoch Kalman filter gain value $K_k$ 2260 from the current-epoch design matrix $H_k$ 2252, the current-epoch a priori error covariance estimate $P_k^-$ 2246, and the current-epoch measurement noise matrix $R_k$. Step 2266 applies Equation 23.13 to compute an a posteriori error covariance estimate $P_k$ 2268 for current epoch k. Predicted post-processed accuracy of rover position accuracy is taken from a posteriori error covariance estimate $P_k$ 2268 as described below. Step 2282 preserves the current-epoch values of a posteriori error covariance estimate $P_k$ 2268 for use in the succeeding epoch as the a posteriori error covariance estimate $P_k^-$ 2248. Step 2272 determines whether another epoch of data is ready for processing. If yes, the flow returns to step 2200. If not, the process ends at 2274.

Presentation of the Computed Accuracies

The a posteriori error covariance estimate $P_k$ 2268 contains variance and covariance data in addition to the values of interest. The values of interest are the 3×3 submatrix containing the variance and covariance for the x, y and z rover position values.

The computed accuracy of the position is a quadratic part of the computed float solution variance/covariance matrix containing just the entries of the position states x, y and z.

$$P_{x,y,z} = \begin{pmatrix} \sigma_x^2 & \sigma_{xy} & \sigma_{xz} \\ \sigma_{xy} & \sigma_y^2 & \sigma_{yz} \\ \sigma_{xz} & \sigma_{yz} & \sigma_z^2 \end{pmatrix} \quad (28)$$

The positions in a GNSS positioning systems are naturally first derived in a Cartesian coordinate system, for example WGS-84 or ITRF. This can be presented in the three position components x, y, z. In applications where the interest typically focuses on the horizontal and/or the vertical accuracies, the positions and their accuracies are typically displayed in a local coordinate system formulated in east, north and up components. In some embodiments of the SPPA predictor the accuracies are displayed in this way, optionally along with the rough rover position.

The transformation from Cartesian coordinates and local coordinates are often done by applying a transformation matrix:

$$M = \begin{pmatrix} -\sin\lambda & \cos\lambda & 0 \\ -\sin\phi\cos\lambda & -\sin\phi\sin\lambda & \cos\phi \\ \cos\phi\cos\lambda & \cos\phi\sin\lambda & \sin\phi \end{pmatrix} \quad (29)$$

The local coordinates east, north and up are then computed from x, y and z as:

$$\begin{pmatrix} e \\ n \\ u \end{pmatrix} = M \cdot \begin{pmatrix} x \\ y \\ z \end{pmatrix} \quad (30)$$

Given that, the variance/covariance matrix $P_{e,n,u}$ of the east, north and up (vertical or height) components can be computed from the variance/covariance matrix $P_{x,y,z}$ of the x, y and z components.

$$P_{e,n,u} = \begin{pmatrix} \sigma_e^2 & \sigma_{en} & \sigma_{eu} \\ \sigma_{en} & \sigma_n^2 & \sigma_{nu} \\ \sigma_{eu} & \sigma_{nu} & \sigma_u^2 \end{pmatrix} = M \cdot P_{x,y,z} \cdot M^T \quad (31)$$

These accuracies can be presented directly. It is also very common to present the combined horizontal accuracy:

$$\sigma_h^2 = \sigma_e^2 + \sigma_n^2 \quad (32)$$

More complicated methods known in the literature take the covariance $\sigma_{en}$ between east and north component into account.

F. VAN DIGGELEN, *GPS Accuracy. Lies, Damn Lies, and Statistics*, GPS WORLD, Nov. 29, 1998, gives a tutorial on how to prepare and interpret 2D and 3D accuracies correctly and refers to the representation of accuracies in the local system.

Another special case is attitude determination. From the vector between rover and reference station (or another specified point) the angles of orientation are computed.

As an example, computing a heading angle (yaw) from the GNSS measurements is analyzed here. The heading is the angle of the vector between the rover position and another position rx, ry and rz relative to north.

$$\begin{pmatrix} dx \\ dy \\ dz \end{pmatrix} = \begin{pmatrix} x - rx \\ y - ry \\ z - rz \end{pmatrix} \quad (33)$$

The first step is to convert the vector components dx, dy and dz to the local system de, dn, du as shown above.

$$\begin{pmatrix} de \\ dn \\ du \end{pmatrix} = M \cdot \begin{pmatrix} dx \\ dy \\ dz \end{pmatrix} \quad (34)$$

The heading angle α is computed using the formula:

$$\alpha = \text{ArcTan}\left(\frac{dn}{de}\right) \quad (35)$$

Standard covariance analysis yields the error estimates for the heading angle $$\sigma_\alpha^2 = \frac{\sigma_h^2}{b^2} = \frac{\sigma_e^2 + \sigma_n^2}{b^2} \quad (36)$$

with b being the baseline (distance) between the rover position and rx, ry, and rz:

$$b = \sqrt{dn^2 + de^2} \quad (37)$$

Using this, the predicted accuracy of the heading angle can be presented to the user and used in the same way as the other predicted accuracies. This can be done in a similar way for other attitude angles like roll and pitch.

Use of the Computed Accuracies

There are several possibilities to use the predicted accuracies in a positioning system. In a system operated by a human operator, the predicted accuracies can be just displayed to the user to leave the decision what to do up to him.

There can be also preset minimum accuracy requirements. Then the user may be notified when the predefined accuracy level is reached. Data storage of the rover data for post processing might be automatically turned off to save memory on the data collection device.

An automated system can use the predicted accuracies in similar ways. For example, data storage can be limited to the time span of data needed to fulfill defined accuracy requirement. In an autonomous system the receiver can be moved to the next position to be determined or the device can automatically terminate the data collection operation. If there are additional data collection devices in the system, for example a camera, operation of those devices can be controlled according to the predicted accuracy level. For example, the error prediction can be used to automate collection of observations in a robotic rover, where the rover stops to collect data and remains stationary until enough data has been collected for that rover position, then move on to the next data collection point. This can be useful, for example, in collecting associated GIS data or obtaining a photograph from the position with associated position information useful for various purposes including photogrammetry.

Thus, the accuracy (error estimate) can be displayed or otherwise made available to the user, can compared with a value representing a desired post-processed accuracy, can be used to signal that enough data has been collected at that rover position to achieve a desired post-processed rover position accuracy, or can be used to terminate collection of observation data when the estimated accuracy reaches a desired value and/or can be used in other ways. Many other uses of the SPPA prediction will be apparent to those of skill in the art.

Other Estimators

The embodiment of FIG. 22A and FIG. 22B gives as an example the Kalman-filter based sub-process 2280 for determining the error covariance estimate $P_k$ 2268. Using rover data only is generally applicable for most position methods. Thus, other methods for determining the error covariance estimate $P_k$ 2268 can be substituted within the spirit and scope of the claimed invention. For example, least-squares methods can be used in place of Kalman filtering methods. Also, a simple filter without time updates can be used, since time updates are not required during periods when it is known that the rover is static, e.g., from user input indicating that the rover is stationary.

The following shows the approach for using least-squares estimation instead of a Kalman filter. The main difference is the lack of a time update step and the simultaneous processing of all data epochs collected so far. Sequential least-squares approaches exist updating only the information provided by the new epochs of data coming in, including methods that only need to include the latest (current) epoch's position explicitly, but the general approach is applicable there, too.

In least squares, the estimation is done in two steps. First, the variance/covariance matrix is computed from the a priori error models and the partial derivatives:

$$P = (H^T \cdot R^{-1} \cdot H)^{-1} \quad (38)$$

Here, H is the design matrix for all observations collected so far, and R is the observation noise matrix for all observations collected so far. Time correlated errors are usually modeled by introducing proper covariance entries between observations collected at different times for the same satellite. P contains the variances and covariances with respect to all states estimated simultaneously for all epochs of data used. P contains the variance/covariance information of the current epoch position.

In the second step, the states are computed from the observations and the variance/covariance matrix computed in the first step:

$$x = P \cdot H^T \cdot R^{-1} \cdot z \quad (39)$$

where z contains all observations collected up to the current epoch and x contains the estimated states for all epoch. Especially, x contains the current epoch's position.

It is trivial to see that applying the first step only will already yield the desired accuracy information without referring to the observation z. Thus, for least-squares approaches the SPPA can be computed from rover-only information, too.

Combination of Aspects and Embodiments, and Further Considerations Applicable to the Above Any plurality of the above described aspects of the invention may be combined to form further aspects and embodiments, with the aim of providing additional benefits notably in terms of convergence speed, recovery from jumps and/or system usability.

Any of the above-described apparatuses and their embodiments may be integrated into a rover, a reference receiver or a network station, and/or the processing methods described can be carried out in a processor which is separate from and even remote from the receivers used to collect the observations (e.g., observation data collected by one or more receivers can be retrieved from storage for post-processing, or observations from multiple network reference stations can be transferred to a network processor for near-real-time processing to generate a correction data stream and/or virtual-reference-station messages which can be transmitted to one or more rovers). Therefore, the invention also relates to a rover, a reference receiver or a network station including any one of the above apparatuses.

In one embodiment, the receiver of the apparatus of any one of the above-described embodiments is separate from the filter and the processing element. Post-processing and network processing of the observations may notably be performed. That is, the constituent elements of the apparatus for processing of observations does not itself require a receiver. The receiver may be separate from and even owned/operated by a different entity than the entity which is performing the processing. For post-processing, the observations may be retrieved from a set of data which was previously collected and stored, and processed with reference-station data which was previously collected and stored; the processing is conducted for example in an office computer long after the data collection and is thus not real-time. For network processing, multiple reference-station receivers collect observations of the signals from multiple satellites, and this data is supplied to a network processor which may for example generate a correction data stream or which may for example generate a "virtual reference station" correction which is supplied to a rover so that the rover can perform differential processing. The data provided to the rover may be ambiguities determined in the network processor, which the rover may use to speed its position solution, or may be in the form of corrections which the rover applies to improve its position solution. The network is typically operated as a service to rover operators, while the network operator is typically a different entity than the rover operator. This applies to each of the above-described apparatuses and claims.

Any of the above-described methods and their embodiments may be implemented by means of a computer program. The computer program may be loaded on an apparatus, a rover, a reference receiver or a network station as described above. Therefore, the invention also relates to a computer program, which, when carried out on an apparatus, a rover, a reference receiver or a network station as described above, carries out any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

GNSS receivers may include an antenna, configured to received the signals at the frequencies broadcasted by the satellites, processor units, one or more accurate clocks (such as crystal oscillators), one or more computer processing units (CPU), one or more memory units (RAM, ROM, flash memory, or the like), and a display for displaying position information to a user.

Where the terms "receiver", "filter" and "processing element" are used herein as units of an apparatus, no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit. For instance, the receiver, the filter and the processing element may be combined to form a single unit, to perform the combined functionalities of the units.

The above-mentioned units may be implemented using hardware, software, a combination of hardware and software, pre-programmed ASICs (application-specific integrated circuit), etc. A unit may include a computer processing unit (CPU), a storage unit, input/output (I/O) units, network connection units, etc.

Although the present invention has been described on the basis of detailed examples, the detailed examples only serve to provide the skilled person with a better understanding, and are not intended to limit the scope of the invention. The scope of the invention is much rather defined by the appended claims.

Additional References incorporated herein by this reference:

L. SJÖBERG, "The best linear combinations of L1 and L2 frequency observables in the application of Transit/Doppler and GPS", MANUSCRIPTA GEODETICA 15, 1990, pp. 17-22.

D. LAPUCHA et al., "Multisite Real-Time DGPS System Using Satellite Data Link. Operational Results", NAVIGATION, Vol. 40, No. 3, Fall 1993, pp. 283-296.

B. REMONDI et al., Final Report: "Investigation of Global Positioning System Single Frequency Hardware for the U.S. Environmental Protection Agency", EPA Reference DW13936132-01-0, April 1994, ten pages.

D. LAPUCHA et al., "High-Rate Precise Real-Time Positioning Using Differential Carrier Phase", ION GPS-95, Sep. 12-15, 1995, Palm Springs, Calif., pp. 1443-1449.

T. YUNCK, "Single-Frequency Precise Orbit Determination", In Parkinson & Spilker (Eds.), Global Positioning System: Theory and Applications Volume II, PROGRESS IN ASTRONAUTICS AND AERONAUTICS, Volume 163, Chapter 21, p. 581 ff., 1996.

D. LAPUCHA et al., "Decimeter-Level Real-Time Carrier Phase Positioning Using Satellite Link", ION GPS 2001, 11.-14. Sep. 2001, Salt Lake City, Utah, pp. 1624-1630.

L. MADER et al., "Using Interpolation and Extrapolation Techniques to Yield High Data Rates and Ionosphere Delay Estimates from Continuously Operating GPS Networks", ION GPS 2002, 24.-27. Sep. 2002, Portland, Oreg., National Geodetic Survey, NOS/NOAA, Silver Spring, Md.

S. BISNATH et al., "Evaluation of commercial carrier phase-based WADGPS services for marine applications", ION GPS/GNSS 2003, 9-12 Sep. 2003, Portland, Oreg.

S. LEUNG et al., "High Precision Real-Time Navigation for Spacecraft Formation Flying", ION GPS/GNSS 2003, 9.-12. Sep. 2003, Portland, Oreg., pp. 2182-2193.

E. GILL et al., "High-Precision Onboard Orbit Determination for Small Satellites—the GPS-Based XNS on X-SAT", $6^{TH}$ SYMPOSIUM ON SMALL SATELLITES SYSTEMS AND SERVICES, 20.-24. Sep. 2004, La Rochelle, France, pp. 1-6.

D. LAPUCHA et al., "Comparison of the two alternate methods of Wide Area Carrier Phase Positioning", ION GNSS $17^{th}$ International Technical Meeting of the Satellite Division, 21.-24. Sep. 2004, Long Beach, Calif., pp. 1864-1871.

Y. GAO et al., "High Precision Kinematic Positioning Using Single Dual-Frequency Receiver", THE INTERNATIONAL ARCHIVES OF THE PHOTOGRAMMETRY, REMOTE SENSING AND SPATIAL INFORMATION SCIENCES, Vol. 34, Part B3, p. 845 ff., Proc. of the $XX^{th}$ ISPRS Congress, Istanbul, Turkey, 2004.

K. CHEN et al., "Real-Time Precise Point Positioning Using Single Frequency Data", ION GNSS $18^{TH}$ INTERNATIONAL TECHNICAL MEETING OF THE SATELLITE DIVISION, 13.-16. Sep. 2005, Long Beach, Calif., pp. 1514-1523.

A. SIMSKY, "Standalone Real-time Navigation Algorithm for Single-frequency Ionosphere-free Positioning Based on Dynamic Ambiguities (DARTS-SF)", ION GNSS $19^{th}$ International Technical Meeting of the Satellite Division, 26.-29. Sep. 2006, Fort Worth, Tex., Session D1, Paper #4, to be published.

Innovative concepts described and illustrated herein include the following:

Methods and apparatus that use the L1-code plus L1-carrier-phase combination $(\rho_1+\lambda_1\phi_1)/2$ together with the L1-carrier-phase observation $(\lambda_1,\phi_1)$ as a new set of observables $[(\rho_1+\lambda_1\phi_1)/2, \lambda_1\phi_1]$ to filter effectively the L1-only case in real-time differential carrier-phase positioning (single and double differences) and standalone real-time single-/precise-point positioning (SPP/PPP, processing of un-differenced code and carrier-phase observations of a single GNSS-receiver, using precise satellite orbits and clocks optionally).

Long distance Multi-Baseline-Averaging (MBA) of floating positions, using non-iono-free observables, in particular using the new L1-only observable set $[(\rho_1+\lambda_1\phi_1)/2, \lambda_1\phi_1]$ for real-time differential carrier-phase positioning.

The methods of the two items above are using the GPS L1 code and carrier-phase measurements as an example. However, any other GNSS single-frequency code and carrier-phase measurements can be used in the same way. Also different single-frequency measurements of different GNSS satellites can be used simultaneously in a receiver.

A method for the prediction of the Stochastic Post-Processing Accuracy (SPPA) in a GNSS receiver during a survey in real-time.

Methods and apparatus incorporating a Kalman-filter-based interpolation/extrapolation scheme that can interpolate/extrapolate reference data to any desired data rate.

Motion Detection Using Kalman Filter States.

Combinations of all above methods to deliver real-time decimeter-level position accuracy with a short convergence time.

Apparatus for performing any one or more of the above methods.

Single- or multi-base operation via a cell-phone link.

Further aspects and inventive concepts include:

1. A method of predicting post-processed accuracy of observations collected at a rover over multiple epochs from signals of GNSS satellites, comprising:
   a. obtaining observations collected at the rover for a current epoch,
   b. obtaining a current-epoch satellite position for each satellite,
   c. obtaining an approximate current-epoch rover position,
   d. obtaining a current-epoch error model,
   e. determining a current-epoch error estimate from the current epoch error models and the current-epoch rover position and the current-epoch satellite positions and a prior-epoch error estimate, the current-epoch error estimate representing an estimated rover position error to be expected upon subsequent differential post-processing of the observations of the plurality of epochs with reference data of a corresponding plurality of epochs, and f. providing the current-epoch error estimate for use in determining whether observations of further epochs are needed to obtain a desired rover position error upon said subsequent differential post-processing.

2. The method of 1, wherein the observations comprise at least one of (1) single-frequency combination observations prepared from single-frequency carrier-phase observations and single-frequency code-phase observations, and (2) multi-frequency observations prepared from carrier-phase observations of a plurality of frequencies.

3. The method of 1 or 2, wherein obtaining a current-epoch satellite position for each satellite comprises at least one of: (1) deriving a current-epoch satellite position from a GNSS satellite navigation message, and (2) deriving a current-epoch satellite position from a source other than a GNSS satellite navigation message.

4. The method of one of 1-3, wherein obtaining a current-epoch rover position comprises at least one of: (1) computing a current-epoch rover position from current-epoch observations, (2) retrieving a previously-stored rover position, and (3) obtaining a current-epoch rover position from user input, and (4) deriving a current-epoch rover position from another data source.

5. The method of one of 1-4, wherein the current-epoch rover position is accurate to within some hundreds of meters.

6. The method of one of 1-5, wherein obtaining current-epoch error models comprises at least one of: (1) determining for each satellite a current-epoch satellite elevation relative to the current-epoch rover position, (2) determining for each satellite a current-epoch carrier-to-noise ratio of a signal received from the satellite, (3) obtaining a model based on atmospheric information, and (4) obtaining a model based on satellite orbit error information.

7. The method of one of 1-6, wherein determining a current-epoch error estimate comprises:
   i. computing a current-epoch time-update matrix from the current-epoch error models,
   ii. computing a current-epoch process-noise matrix from the error models
   iii. computing an current-epoch a priori error estimate from the current-epoch time-update matrix and the current-epoch process-noise matrix,
   iv. computing a current-epoch design matrix from the current-epoch rover position and the current-epoch satellite positions,
   v. computing a current-epoch measurement noise matrix from the current-epoch error models,
   vi. computing a current-epoch filter gain from the current-epoch design matrix, the current-epoch a priori error estimate and the current-epoch measurement noise matrix, and
   vii. computing a current-epoch a posteriori error estimate from the current-epoch a priori error estimate, the current-epoch filter gain, and the current-epoch design matrix.

8. The method of 7, wherein computing a current-epoch design matrix comprises at least one of: (1) deriving a current-epoch satellite position from a GNSS satellite navigation message, and (2) deriving a current-epoch satellite position from a source other than a GNSS satellite navigation message.

9. The method of one of 1-8, further comprising determining from the current-epoch error estimate whether observations of further epochs are needed to obtain a desired rover position error upon said subsequent differential post-processing.

10. The method of one of 1-9, further comprising at least one of: (1) displaying the current-epoch error estimate, (2) comparing the current-epoch error estimate with a value representing a desired rover position error upon said subsequent differential post-processing, (3) signaling that observations of enough epochs have been collected to obtain a desired rover position error upon said subsequent differential post-processing, and (4) terminating collection of observations when the current-epoch error estimate reaches a desired value.

11. Apparatus for predicting post-processed accuracy of observations collected at a rover over multiple epochs from signals of GNSS satellites, comprising:
    a. a first element to obtain observations collected at the rover for a current epoch,
    b. a second element to obtain a current-epoch satellite position for each satellite,
    c. a third element to obtain a current-epoch rover position,
    d. a fourth element to obtain current-epoch error models,
    e. a fifth element to determine a current-epoch error estimate from the current epoch error models and the current-epoch rover position and the current-epoch satellite positions and a prior-epoch error estimate, the current-epoch error estimate representing an estimated rover position error to be expected upon subsequent differential post-processing of the observations of the plurality of epochs with reference data of a corresponding plurality of epochs, and
    f. a sixth element to provide the current-epoch error estimate for use in determining whether observations of further epochs are needed to obtain a desired rover position error upon said subsequent differential post-processing.

12. The apparatus of 11, wherein the observations comprise at least one of (1) single-frequency combination observations prepared from single-frequency carrier-phase observations and single-frequency code-phase observations, and (2) multi-frequency minimum-error combination observations prepared from carrier-phase observations of a plurality of frequencies.

13. The apparatus of 11 or 12, wherein the second element is operative to determine a current-epoch satellite position for each satellite by at least one of: (1) deriving a current-epoch satellite position from a GNSS satellite navigation message, and (2) deriving a current-epoch satellite position from satellite a source other than a GNSS satellite navigation message.

14. The apparatus of one of 11-13, wherein the third element is operative to determine a current-epoch rover position by at least one of: (1) computing a current-epoch rover position from current-epoch observations, (2) retrieving a previously-stored rover position, and (3) obtaining a current-epoch rover position from user input, and (4) deriving a current-epoch rover position from a data source.

15. The apparatus of one of 11-14, wherein the third element is operative to determine the current-epoch rover position with an accuracy of about 100 meters.

16. The apparatus of one of 11-15, wherein the fifth element is operative to obtain current-epoch error models by at least one of: (1) determining for each satellite a current-epoch satellite elevation relative to the current-epoch rover position, (2) determining for each satellite a current-epoch carrier-to-noise ratio of a signal received from the satellite, (3) obtaining a model based on atmospheric information, and (4) obtaining a model based on satellite orbit error information.

17. The apparatus of one of 11-16, wherein the fifth element to determine a current-epoch error estimate is operative to:
    i. compute a current-epoch time-update matrix from the current-epoch error models,
    ii. compute a current-epoch process-noise matrix from the error models
    iii. compute an current-epoch a priori error estimate from the current-epoch time-update matrix and the current-epoch process-noise matrix,
    iv. compute a current-epoch design matrix from the current-epoch rover position and the current-epoch satellite positions,
    v. compute a current-epoch measurement noise matrix from the current-epoch error models,
    vi. compute a current-epoch filter gain from the current-epoch design matrix, the current-epoch a priori error estimate and the current-epoch measurement noise matrix, and
    vii. compute a current-epoch a posteriori error estimate from the current-epoch a priori error estimate, the current-epoch filter gain, and the current-epoch design matrix.

18. The apparatus of 17, wherein the fifth element is operative to compute a current-epoch design matrix by at least one of: (1) deriving a current-epoch satellite position from a GNSS satellite navigation message, and (2) deriving a current-epoch satellite position from a source other than a GNSS satellite navigation message.

19. The apparatus of one of 11-18, further comprising an element operative to determine from the current-epoch error estimate whether observations of further epochs are needed to obtain a desired rover position error upon said subsequent differential post-processing.

20. The apparatus of one of 11-19, further comprising a element operative to perform at least one of: (1) displaying the current-epoch error estimate, (2) comparing the current-epoch error estimate with a value representing a desired rover position error upon said subsequent differential post-processing, (3) signaling that observations of enough epochs have been collected to obtain a desired rover position error upon said subsequent differential post-processing, and (4) terminating collection of observations when the current-epoch error estimate reaches a desired value.

21. The apparatus of one of 11-20, wherein the first element comprises a GNSS receiver.

22. An article of manufacture comprising a computer-readable medium having instructions stored therein for causing a machine to perform the method of one of 1-10.

23. A method of determining position of a rover from observations of GNSS signals, comprising:
    a. obtaining observations of GNSS signals at a rover location,
    b. obtaining observations of the GNSS signals at plurality of reference stations, each reference station defining a respective baseline between the rover location and a reference station location,
    c. for each reference station, determining a respective differentially-corrected rover position, and
    d. preparing a weighted combination of the differentially-corrected rover positions, 24. The method of 23, further comprising determining a quality measure for each of the differentially-corrected rover positions and preparing the weighted combination as a function of the quality measures.

25. The method of one of 23-24, wherein the quality measure is an inverse covariance.

26. The method of one of 23-26, wherein at least one of the differentially-corrected rover positions is based on a single-frequency observable combination.

27. The method of one of 23-26, wherein at least one of the differentially-corrected rover positions is based on a multiple-frequency ionosphere-free observable combination.

28. The method of one of 23-27, wherein at least one of the differentially-corrected rover positions is based on a multiple-frequency code-phase observable combination.

29. The method of one of 23-28, wherein at least one of the differentially-corrected rover positions is based on a single frequency carrier-phase and code-plus-carrier-phase combination.

30. Apparatus for of determining position of a rover from observations of GNSS signals collected at a rover location and at a plurality of reference stations, each reference station defining a respective baseline between the rover location and a reference station location, comprising
    a. an element to determine, for each reference station, a respective differentially-corrected rover position, and
    b. an element to prepare a weighted combination of the differentially-corrected rover positions, 31. The apparatus of 30, further comprising an element to determine a quality measure for each of the differentially-corrected rover positions, wherein the weighted combination is prepared as a function of the quality measures.

32. The apparatus of one of 30-31, wherein the quality measure is an inverse covariance.

33. The apparatus of one of 30-32, wherein at least one of the differentially-corrected rover positions is based on a single-frequency observable combination.

34. The apparatus of one of 30-33, wherein at least one of the differentially-corrected rover positions is based on a multiple-frequency ionosphere-free observable combination.

35. The apparatus of one of 30-34, wherein at least one of the differentially-corrected rover positions is based on a multiple-frequency code-phase observable combination.

36. The apparatus of one of 30-35, wherein at least one of the differentially-corrected rover positions is based on a single frequency carrier-phase and code-plus-carrier-phase combination.

37. An article of manufacture comprising a computer-readable medium having instructions stored therein for causing a machine to perform the method of one of 23-29.

38. A method of determining movement of a rover from observations of GNSS satellites collected at the rover over multiple epochs, comprising:

39. estimating values for a first set of rover position states and a first rover clock state from observations of a first epoch, 40. estimating values for a second set of rover position states and a second rover clock state from observations of a second epoch, 41. comparing the values of the first set of rover position states with the values of the second set of position states to determine whether there is a difference, 42. if a difference is determined, updating the values of the first set of rover position states from observations of a third epoch, and 43. if a difference is not determined, updating the values of the second set of rover position states from observations of the third epoch.

44. The method of 38, further comprising updating the first rover clock state and the second rover clock state during alternate epochs.

45. The method of one of 38 or 39, further comprising estimating motion of the rover from epoch to epoch from the values of the first set of rover position states and the values of the second set of rover position states.

46. Apparatus for determining movement of a rover from observations of GNSS satellites collected at the rover over multiple epochs, comprising a filter to estimate values for a first set of rover position states and a first rover clock state from observations of a first epoch and to estimate values for a second set of rover position states and a second rover clock state from observations of a second epoch, a comparator to determine whether there is a difference between values of the first set of rover position states and the values of the second set of position states, and a toggle to cause the filter to update updating the values of the first set of rover position states from observations of a third epoch if a difference is determined and to update the values of the second set of rover position states from observations of the third epoch if a difference is not determined.

47. The apparatus of 41, wherein the filter is operative to update the first rover clock state and the second rover clock state during alternate epochs.

48. The apparatus of 41 or 42, wherein the filter is further operative to estimate motion of the rover from epoch to epoch from the values of the first set of rover position states and the values of the second set of rover position states.

49. An article of manufacture comprising a computer-readable medium having instructions stored therein for causing a machine to perform the method of one of 38-40.

The invention claimed is:

1. A method of predicting post-processed accuracy of observations collected at a rover over multiple epochs from signals of GNSS satellites, comprising:
   a. obtaining observations collected at the rover for a current epoch,
   b. obtaining a current-epoch satellite position for each satellite,
   c. obtaining an approximate current-epoch rover position,
   d. obtaining a current-epoch error models,
   e. determining a current-epoch error estimate from the current epoch error models and the approximate current-epoch rover position and the current-epoch satellite positions and a prior-epoch error estimate, the current-epoch error estimate representing an estimated rover position error to be expected upon subsequent differential post-processing of the observations of the plurality of epochs with reference data of a corresponding plurality of epochs, and
   f. providing the current-epoch error estimate for use in determining whether observations of further epochs are needed to obtain a desired rover position error upon said subsequent differential post-processing.

2. The method of claim 1, wherein the observations comprise at least one of (1) single-frequency combination observations prepared from single-frequency carrier-phase observations and single-frequency code-phase observations, and (2) multi-frequency observations prepared from carrier-phase observations of a plurality of frequencies.

3. The method of claim 1, wherein obtaining the current-epoch satellite position for each satellite comprises at least one of: (1) deriving the current-epoch satellite position from a GNSS satellite navigation message, and (2) deriving the current-epoch satellite position from a source other than a GNSS satellite navigation message.

4. The method of claim 1, wherein obtaining the approximate current-epoch rover position comprises at least one of: (1) computing the approximate current-epoch rover position from current-epoch observations, (2) retrieving a previously-stored rover position, and (3) obtaining the approximate current-epoch rover position from user input, and (4) deriving the approximate current-epoch rover position from another data source.

5. The method of claim 1, wherein the current-epoch rover position is accurate to within some hundreds of meters.

6. The method of claim 1, wherein obtaining the current-epoch error models comprises at least one of: (1) determining for each satellite a current-epoch satellite elevation relative to the current-epoch rover position, (2) determining for each satellite a current-epoch carrier-to-noise ratio of a signal received from the satellite, (3) obtaining a model based on atmospheric information, and (4) obtaining a model based on satellite orbit error information.

7. The method of claim 1, wherein determining the current-epoch error estimate comprises:
   i. computing a current-epoch time-update matrix from the current-epoch error models,
   ii. computing a current-epoch process-noise matrix from the error models
   iii. computing an current-epoch a priori error estimate from the current-epoch time-update matrix and the current-epoch process-noise matrix,
   iv. computing a current-epoch design matrix from the current-epoch rover position and the current-epoch satellite positions,
   v. computing a current-epoch measurement noise matrix from the current-epoch error models,
   vi. computing a current-epoch filter gain from the current-epoch design matrix, the current-epoch a priori error estimate and the current-epoch measurement noise matrix, and
   vii. computing a current-epoch a posteriori error estimate from the current-epoch a priori error estimate, the current-epoch filter gain, and the current-epoch design matrix.

8. The method of claim 7, wherein computing the current-epoch design matrix comprises at least one of: (1) deriving the current-epoch satellite position from a GNSS satellite navigation message, and (2) deriving the current-epoch satellite position from a source other than a GNSS satellite navigation message.

9. The method of claim 1, further comprising determining from the current-epoch error estimate whether observations of further epochs are needed to obtain a desired rover position error upon said subsequent differential post-processing.

10. The method of claim 1, further comprising at least one of: (1) displaying the current-epoch error estimate, (2) comparing the current-epoch error estimate with a value representing a desired rover position error upon said subsequent differential post-processing, (3) signaling that observations of enough epochs have been collected to obtain a desired rover position error upon said subsequent differential post-processing, and (4) terminating collection of observations when the current-epoch error estimate reaches a desired value.

11. Apparatus for predicting post-processed accuracy of observations collected at a rover over multiple epochs from signals of GNSS satellites, comprising,
   a. a first element to obtain observations collected at the rover for a current epoch,
   b. a second element to obtain a current-epoch satellite position for each satellite,
   c. a third element to obtain a current-epoch rover position,
   d. a fourth element to obtain current-epoch error models,
   e. a fifth element to determine a current-epoch error estimate from the current epoch error models and the current-epoch rover position and the current-epoch satellite positions and a prior-epoch error estimate, the current-epoch error estimate representing an estimated rover position error to be expected upon subsequent differential post-processing of the observations of the plurality of epochs with reference data of a corresponding plurality of epochs, and
   f. a sixth element to provide the current-epoch error estimate for use in determining whether observations of further epochs are needed to obtain a desired rover position error upon said subsequent differential post-processing.

12. The apparatus of claim 11, wherein the observations comprise at least one of (1) single-frequency combination observations prepared from single-frequency carrier-phase observations and single-frequency code-phase observations, and (2) multi-frequency minimum-error combination observations prepared from carrier-phase observations of a plurality of frequencies.

13. The apparatus of claim 11, wherein the second element is operative to determine the approximate current-epoch satellite position for each satellite by at least one of: (1) deriving the approximate current-epoch satellite position from a GNSS satellite navigation message, and (2) deriving the approximate current-epoch satellite position from satellite a source other than a GNSS satellite navigation message.

14. The apparatus of claim 11, wherein the third element is operative to determine the approximate current-epoch rover position by at least one of: (1) computing the approximate current-epoch rover position from current-epoch observations, (2) retrieving a previously-stored rover position, and (3) obtaining the approximate current-epoch rover position from user input, and (4) deriving a current-epoch rover position from a data source.

15. The apparatus of claim 11, wherein the third element is operative to determine the current-epoch rover position with an accuracy of about 100 meters.

16. The apparatus of claim 11, wherein the fifth element is operative to obtain the current-epoch error models by at least one of: (1) determining for each satellite a current-epoch satellite elevation relative to the current-epoch rover position, (2) determining for each satellite a current-epoch carrier-to-noise ratio of a signal received from the satellite, (3) obtaining a model based on atmospheric information, and (4) obtaining a model based on satellite orbit error information.

17. The apparatus of claim 11, wherein the fifth element to determine a current-epoch error estimate is operative to:
   i. compute a current-epoch time-update matrix from the current-epoch error models,
   ii. compute a current-epoch process-noise matrix from the error models
   iii. compute an current-epoch a priori error estimate from the current-epoch time-update matrix and the current-epoch process-noise matrix,
   iv. compute a current-epoch design matrix from the current-epoch rover position and the current-epoch satellite positions,
   v. compute a current-epoch measurement noise matrix from the current-epoch error models,
   vi. compute a current-epoch filter gain from the current-epoch design matrix, the current-epoch a priori error estimate and the current-epoch measurement noise matrix, and
   vii. compute a current-epoch a posteriori error estimate from the current-epoch a priori error estimate, the current-epoch filter gain, and the current-epoch design matrix.

18. The apparatus of claim 17, wherein the fifth element is operative to compute the current-epoch design matrix by at least one of: (1) deriving the current-epoch satellite position from a GNSS satellite navigation message, and (2) deriving the current-epoch satellite position from a source other than a GNSS satellite navigation message.

19. The apparatus of claim 11, further comprising an element operative to determine from the current-epoch error estimate whether observations of further epochs are needed to obtain a desired rover position error upon said subsequent differential post-processing.

20. The apparatus of claim 11, further comprising a element operative to perform at least one of: (1) displaying the current-epoch error estimate, (2) comparing the current-epoch error estimate with a value representing a desired rover position error upon said subsequent differential post-processing, (3) signaling that observations of enough epochs have been collected to obtain a desired rover position error upon said subsequent differential post-processing, and (4) terminating collection of observations when the current-epoch error estimate reaches a desired value.

21. The apparatus of claim 11, wherein the first element comprises a GNSS receiver.

22. An article of manufacture comprising a computer-readable medium instructions stored therein for causing a machine to perform the method of claim 1.

* * * * *